United States Patent [19]
Hou

[11] Patent Number: 5,859,788
[45] Date of Patent: Jan. 12, 1999

[54] MODULATED LAPPED TRANSFORM METHOD

[75] Inventor: Hsieh Sheng Hou, Rancho Palos Verdes, Calif.

[73] Assignee: The Aerospace Corporation, El Segundo, Calif.

[21] Appl. No.: 911,614

[22] Filed: Aug. 15, 1997

[51] Int. Cl.$^6$ .................................................. G06F 17/14
[52] U.S. Cl. ........................................................ 364/725.01
[58] Field of Search ........................ 364/725.01, 725.02, 364/725.03, 726.01, 726.02, 726.03, 726.04, 726.05, 726.06, 726.07

[56] References Cited

U.S. PATENT DOCUMENTS 5,408,425  4/1995  Hou ..................................... 364/725.03
5,715,280  2/1998  Sandberg et al. ....................... 375/260

OTHER PUBLICATIONS

Murthy et al. "On the Hardware Implementation of the Lapped Orthogonal Transform and the Modulated Lapped Transform", IEEE, pp. 745–748, 1992.
"On Computing the 2–D Modulated Lapped Transform in Real–Time", E. Frantzeskakis and H.C. Karathanasis, Journal VLSI Signal Processing VI, IEEE Press, pp. 361–369, 1993.
"Time–Recursive Computation and Real–Time Parallel Architectures, With Application on the Modulated Lapped Transform", E. Frantzeskakis, J.S. Baras, K.J. Ray Liu, SPIE vol. 2027, pp. 100–111, 1993.
"Signal Processing With Lapped Transforms", H.S. Malvar, Norwood, MA, Artech House, 1992, pp. 175–218.
"Extended Lapped Transforms: Properties, Applications and Fast Algorithms", H.S. Malvar, IEEE Transactions on Signal Processing, vol. 40, pp. 2703–2714, Nov. 1992.
"Overlapping Block Transform: Window Design, Fast Algorithm and an Image Coding Experiment", M. Temerinac & B. Edler, IEEE Transactions on Communications, vol. 43, pp. 2417–2425, Sep. 1995.
"A VLSI Architecture for the Real–Time Computation of Discrete Trigonometric Transforms", J. Canaris, J. VLSI Signal Processing, vol. 5, pp. 95–104, 1993.

*Primary Examiner*—Chuong Dinh Ngo
*Attorney, Agent, or Firm*—Derrick Michael Reid

[57] ABSTRACT

A fast modulated lapped transform (MLT) method and architecture for image compression and decompression systems minimizes blocking artifacts associated with JPEG based discrete cosine transform (DCT) image compression systems. The MLT method combines fast block processing capabilities of wavelet transforms and fast block processing of DCT image compression systems. The modular and pipeline MLT architecture is fast by block processing but avoids the visual blocking artifacts that can be seen in most DCT-based compression systems. Improved MLT processors are implemented by an infinite impulse response filter operating on a product of the MLT window function and the input data stream. Forward and reverse MLT processors include a new fused multiply-add logic for fast computations and localized interconnections. The MLT processors can be combined into a bank of parallel processors in a one dimensional MLT architecture, which can be used for two-dimensional image transformation. The improved MLT implementation enables a modular architecture having a reduce number of multipliers and interconnects well suited for practical VLSI implementation.

20 Claims, 13 Drawing Sheets

Forward MLT Architecture

Image Compression Decompression Process

MLT Overlapping Windows

FIG. 3  MLT Weighting Sequences

Forward MLT Architecture

Forward MLT Processor

Forward MLT Architecture

Forward MLT Processor

Inverse MLT Architecture

Inverse MLT Processor

Inverse MLT Architecture

Inverse MLT Processor

2-D MLT Architecture Using 1-D Processing

2-D MLT Transformation

MODULATED LAPPED TRANSFORM METHOD

STATEMENT OF GOVERNMENT INTEREST

The invention was made with Government support under Contract No. F04701-93-C-0094 by the Department of the Air Force. The Government has certain rights in the invention. The invention described herein may be manufactured and used by and for the government of the United States for governmental purpose without payment of royalty therefor.

FIELD OF THE INVENTION

The invention relates to the field of image compression. More particularly, the present invention relates to modulated lapped transforms of image data during image compression and decompression.

BACKGROUND OF THE INVENTION

Future multispectral and hyperspectral remote sensing systems and image archives will benefit from effective, high-fidelity image compression techniques. The objective of image data compression is to represent the compressed image with as few bits as possible while retaining sufficient image quality following decompression. In evaluating the effects of compression upon image data, the qualitative and quantitative effects upon the images are considered as well as end user products that are derived from the imagery through the application of environmental retrieval algorithms. Spaceborne remote sensing systems, and the image data archives for those systems will benefit from effective, high-fidelity image compression techniques. Due to practical limitations in onboard storage capacity, downlink contact time, and downlink bandwidth, it will often not be possible to capture the imagery as it was originally acquired with its full spatial, spectral, and radiometric resolution. Onboard image data compression can be used to reduce redundancy in the original input imagery, so that only the real information content need be stored or transmitted. For instance, a spaceborne panchromatic sensor with a ground footprint of one meter, a fifteen kilometer swath and twelve bits per pixel encoding, has a raw data rate of 1.26 Gbps, which exceeds envisioned downlink bandwidths and which will rapidly fill onboard storage media. Adding a multispectral capability with a lower resolution of five meters would magnify the problem by twenty percent for five additional bands. Extrapolating this example, an ambitious hyperspectral sensor can generate raw data rates at many Gbps. Remote image and sound sensing systems can benefit from the availability of high-quality compression techniques. High-resolution commercial remote sensing systems would benefit from high-quality compression methods. The use of lossless compression methods are preferred, but often are not practical in image systems requiring reliable good image quality with compression ratios of at least ten to one.

Referring to FIG. 1, a prior art image compression decompression process operates on an original input image 10 first by image compression 12 providing a compressed image 14 subjected to image decompression to provide a decompressed image 17 reconstructed from the compressed image 14. The effectiveness of the compression decompression method relates to the decompressed image quality compared to the input image 10, and the amount of data compression. The image compression and decompression are inverse operations. Image compression process 12 includes forward transformation 20, quantization 22 and entropy encoding 24. The input image 10 is compressed by image compression including forward transformation 20, quantization 22 and encoding 24 of the input image 10 to produce the compressed image 14. The input image 10 is compressed into the fewest amount of data bits of the compressed image 14 for ease of storage and transmission. The image compression 12 compresses the input image 10 into a transformed, quantized and encoded output compressed image 14 preferably having high quality image data compression at a high compression ratio. The compressed image 14 is decompressed by the image decompression process 17 including decoding 26, dequantization 28 and inverse transformation 30 to reconstruct the compressed image 14 as a decompressed image 18. Preferably, the decompressed image 18 is a lossless version of the input image 10. However, image compression 12 and decompression 16 generates artifacts in the decompressed image 18.

The input image is scanned into the forward transform, for example, using a raster row scan, a raster column scan, zig-zag, or a peano scan. The scanned pixelized data is reformatted for processing by the forward transform. The forward transform provides transformed data which is typically floating point array data, for example, formatted in an IEEE format having a sign, mantissa and exponent of thirty-two bits. The transformed data is referred to as coefficients, which are then quantized typical using scalar divisors defining a bin width, followed by truncation to produce quantized data in integer form of nearly continuous finite discrete values. Transformation and quantization disadvantageously results in a loss of image information. The quantized data may be represented, for example, as a signed two byte word, denoted as a symbol which can be encoded resulting a compressed image of codewords which may be further packed for storage and subsequently unpacked prior to decompression.

The methods of gray scaled image data compression have been typically based on two different orthogonal transform methods, the block transform method or the wavelet transform. In a block transform compression method, an original input image is segmented into blocks of pixel data, and each block of pixel data is transformed into a respective block of transformed data followed by respective block wise quantization and encoding. Block wise transformation results in blocking artifacts. In a wavelet transform, an original input image is convoluted into an entire transformed image. In block transform or wavelet transform, a plurality of finite impulse response (FIR) filters may be multiple tap digital filters and used to generate a respective plurality of filtered images having respective frequency content based upon the FIR filters. The filters operate over a predetermined block size of a plurality of pixels data points on the serially shifted input pixel data. For each shifted input pixel, and transform output coefficient is provided based upon filtering the plurality of pixel data point within the block. Various spectral filters may be used. For example, a high frequency filter and a low frequency filter can be simultaneously used to respectively simultaneously generate a high frequency image and a low frequency image. The resulting images are then down sampled, for example, by two to remove alternating data points of each filtered image to reduce the number data points back into the original input image size, such that the transformation does not compress data, but typical requires additional storage because the floating point data requires more storage than the original gray scale byte. The forward transform can be reapplied to the transform data to sufficiently capture a high fidelity two dimensional image. For example, the forwards transform could operate by row raster scan of the original input image to produce a first transformed image which is then column raster scanned and transformed to produce the final transformed image which is based upon row and column transformation for improved transformed image quality.

An exemplar block transform is the Discrete Cosine Transform. (DCT) which is used in current international standards for still image and motion picture compression. Compression blocking artifact errors results from DCT based algorithms, which include the Joint Photographic Experts Group (JPEG) compression scheme. In the international data compression standard, MPEG II Level 3 contains the specifications for audio compression which uses MLT, also called the modulated discrete cosine transform, of block lengths six and eighteen. The DCT compression may include a split-radix approach, which is the fastest known DCT algorithm. For compression with a bit rate below 1 bit per pixel, the DCT disadvantageously results in objectionable blocking artifacts. In applying DCT method to obtain high compression ratios at bit. rates below one bit per pixel, the block boundaries defects often appear in the reconstructed decompressed images. Such defects are blocking artifacts. In the JPEG standard, a two-dimensional DCT is used for still image compression and decompression. However, at high compression ratios, the DCT based JPEG method has produced serious blocking artifacts in the decompressed images.

In the DCT compression method, the image is segmented into small blocks, such as an 8×8 pixel by pixel square, prior to compression. The net output sizes of the DCT are eight pixel by eight pixel blocks. The transformed coefficients from the DCT are floating point numbers. The quantization process converts the floating point transformed coefficients into positive or negative integers by first dividing each of the floating-point transformed coefficient by a corresponding integer in a quantization matrix, and then rounding off the results into integers. In the DCT transform domain, the coefficient at the upper-left corner of the 8×8 matrix is the lowest frequency term. The lower-right corner is the highest frequency term usually a small number. Taking advantage of human visual characteristics, many of the high frequency terms may be truncated by the quantization process with only a small loss of visual image quality. However, in the DCT method, the quantization causes the blocking effect.

The wavelet transform is a convolution transform of the entire image. The entire original input image is serially shifted into the wavelet transform to produce an entire transform image. The wavelet transform must convolve the image wise the entire image which requires large temporary memory stores and require serial slow processing. Even though the wavelet transform method does not produce serious blocking artifacts at a low bit rate, the wavelet transform processing speed in conventional implementations is disadvantageously slow because of the image wise convolution. The Modulated Lapped Transform (MLT) is a hybrid transform. The desirable property of the MLT is the advantageous high speed of the DCT and the reduced blocking artifacts of wavelet transform. The MLT employs a scan, which may be for example, a raster scan or a peano scan for inputing data into the MLT. The MLT uses a subband filter bank and the window used in MLT spans two DCT blocks, but the window shifts block-by-block. Thus, the MLT performs not only a fast DCT but also a blockwise convolution for reduce blocking artifacts. The use of overlapped windows in MLT obviates many of the blocking artifacts occurring at low-bit rates for the DCT compression method.

In both of the DCT and MLT compression methods, the image is segmented into small blocks, for example, 8 pixel by 8 pixel square, prior to compression. However, in the MLT, there are initially 16 pixels, in one dimension, being shifted into the MLT. These 16 pixels represent the overlapping of two 8 pixel blocks. Subsequently, the MLT retains the latter 8 pixels and inputs 8 more for transformation. The net output sizes in both DCT and MLT are still 8 pixel by 8 pixel blocks. The transformed coefficients from the DCT and MLT are both floating-point numbers. In both the DCT and MLT transform domains, the coefficient at the upper-left corner of the 8×8 matrix is the lowest frequency term. The lower-right corner is the highest frequency term usually a small number. In DCT method the quantization causes the blocking effect whereas in MLT method, the high frequency terms roll off much faster than the DCT method because of the use of overlapping windows. Thus, there are mare high frequency terms that have been saved from quantization. Consequently, the reconstructed image quality is superior when MLT is compared to DCT for the same bit rate.

The subsequent entropy encoding assigns a binary code to the quantized transformed coefficients. Such a lossless process is called entropy encoding because the length of the code is proportional to the entropy. The most probable lowest entropy sample is coded with the shortest code. A commonly used entropy encoder is the Huffman code, even though JPEG standard also allows for the Arithmetic code. However, these entropy encoders prefer one-dimensional input data streams. To convert the two-dimensional quantized block into a one-dimensional data stream for entropy encoding, a zig-zag scan pattern according to JPEG specification for DCT may be used for both DCT and MLT. The zig-zag scan increases the zero run length, thus increasing the compression ratio when the run is coded in the entropy encoders. The input to the entropy encoders are fixed-length binary numbers representing the quantized samples and run lengths. However the output from the entropy encoders are variable-length binary codes and a data buffer is needed at the encoder output. The data buffer regulates the output data rate for the fixed bandwidth channels, and generate data packets for error protection during transmission.

An MLT transform is typically defined by a transform kernel. The MLT transform kernel is the product of a window function W and a modulation function F both operating over a plurality of blocks of M pixels over a window of N pixels. The transform kernel $W(n)F(k,n)$ is multiplied by input data stream $X(n)$ for n pixels of the window for k pixels of each output block to provide a transformed output $Z(k)$ summed for each element of the pixel input stream, that is, $Z(k)=c\Sigma X(n) W(n) F(k,n)$, for $n=1 \rightarrow N$ for each $k=1 \rightarrow M$, with a scalar c. The window function may be for example a half sin function, $W(n)=\sin[(2n-1)(\pi/2N)]$. The modulation function may be a discrete cosine function with a shifted phase, $F(k,n)=\cos[(\pi/4M)(2k-1)(2n+M-1)]$, where N is the window size, e.g. 16, M is the block size, e.g. 8, and n is the running index of the input stream, $1 \rightarrow N$ for the window size, and k an output pixel index, $1 \rightarrow M$ for the block size. A scalar c, and a normalization factor of square root of (2/M) are incorporated into the transform function. The input pixel is represented by $X(n)$. The transform function can be expressed as a summation of a product of the window sin function and the modulation cosine function and the input pixel $X(n)$ for $n=1 \rightarrow N$ the window size and for each $k=1 \rightarrow M$, the block size.

$$Z(k)=c\sqrt{2/M}\Sigma_{n-1}^{N}\{\sin[(2n-1)(\pi/2N)]$$
$$\cos[(\pi/4M)(2k-1)(2n+M-1)]X(n)\}$$

The availability of a cost-effective VLSI hardware implementation can be applied to compression algorithms. Considerations implementation feasibility limit the usefulness of MLT method. The complexity of the VLSI architecture implementation is determined by the form transform function equation. The mathematical manipulation of the MLT transform equation into alternative form of expressions can be translated into alternative hardware architecture configuration.

One such mathematical manipulation of the transform function equation is to convert the kernel transform function of the sine cosine product into a sum of sine function using the trigonometric relation 2 sin (x) cos (y)=sin (x+y)+sin (x−y). The resulting MLT architecture is a fast MLT system comprising a front end infinite impulse response (IIR) filter operating the input data stream X(n) but disadvantageously consists of eight modules, with each module using six multipliers. Another such mathematical manipulation of the transform function equation is to decompose the MLT into a parallel butterfly bank of multipliers with many DCT modules. A fast DCT processor can be designed according to a Split-Radix DCT method disclosed in U.S. Pat. No. 5,408,425 by Hou on Apr. 18, 1995.

Even though the fast MLT and the fast DCT methods can process images at very high speed on a general-purpose computer or on a programmable digital signal processor, such a fast DCT processor is not tailored for VLSI chip implementations because of the complexity of the resulting equations. These two MLT implementations resulting from the respective mathematical manipulation of the MLT transform function require too many interconnects and too many arithmetic processing units. Important prerequisites of VLSI designs are the use the least number of multipliers and interconnections in order to decrease chip layout complexity and silicon area. Decreasing the number of interconnects and the number of multipliers would save valuable silicon areas in a VLSI chip and simplifies the layouts and routing, for cost effective practical production. Repetitive cost effective VLSI designs and layouts are enhanced by modular designs. These MLT designs are not modular because the interconnections are not local to the individual multipliers disadvantageously complicating the VLSI implementation.

An MLT image compression decompression algorithm can be implemented using various VLSI architectures realized from respective alternatives form of the manipulated transform equation. It is desirable in VLSI designs to use the least number of multipliers and interconnections in order to decrease the chip layout complexity and silicon area. Prior MLT algorithms require the use of many multipliers and interconnections between the multipliers. Consequently, the design of MLT unit will disadvantageously not be modular because the interconnections are not local to the individual multipliers. These conventional MLT algorithms use the FIR digital filters or the in-place Fast Fourier Transform (FFT) which of all disadvantageously require many multipliers and interconnects. The FFT filter disadvantageously requires that the input data length be an integer power of two. These and other disadvantages are solved or reduced using the invention.

SUMMARY OF THE INVENTION

An object of the invention is provide a image transform compression and decompression method for reducing blocking artifacts in a resulting decompressed image.

Another object of the invention is to provide a modulated lapped transform (MLT) compression and decompression method that can be implemented using practical VLSI technology.

Another object of the invention is to implement the modulation function of the MLT as a recursive filter function operating on the product of a window function of the MLT multiplied by an input data stream.

Another object of the invention is to implement the modulation function of the MLT transform function as a recursive infinite impulse response filter.

Another object of the invention is to provide a MLT compression and decompression system and method using the least number of multipliers and interconnections.

Yet another object of the invention is to provide a fast MIST method implemented by a VLSI pipeline architecture.

Another object of the invention is to provide a fast MLT method implemented using modular processors having a few number of multipliers and interconnections.

The present inventions are methods and implementations of a modulated lapped transforms (MLT) algorithm derived from manipulation of the modulation function F(k,n) of the MLT kernel in the MLT transform equation resulting infinite impulse response (IIR) filter operating on the input product of the input data stream X(n) and the window function W(n) for practical VLSI implementations preferably for used in image compression and decompression systems. The MLT transform function of Z(k)=Σ W(n) F(k,n) X(n) provides a W(n)X(n) product which is implemented by the use of the a window multiplier. The modulated function F(k,n) is mathematically manipulated into the IIR filter digitally and recursively operating on W(n)X(n) window product. The IIR filter function is implemented in a forward processor (FP) in a forward MLT architecture, an in an inverse processor (IP) in an inverse MLT architecture. Each architecture is implemented with a few multipliers in a forward processor for use in the forward MLT architecture and one multiplier in an inverse processor for use in the inverse MLT architecture. Each forward processor or inverse processor preferably comprises the IIR filter which can be implemented with only three multipliers in the forward processor and with one multiplier in the inverse processor both with localized interconnects supporting a modular architecture. The inverse processors and forward processors are modular units that can be combined as bank of processors in the forward and inverse MLT architectures. There is no restriction on the data length in the preferred MLT processor design because of the effective use of infinite impulse response filters in a pipeline architecture.

The MLT compression method enables fast processing using a one dimensional hardware architecture which can be replicated to process a two dimensional image. The MLT transform can be applied as a one dimensional MLT transform operating on a one dimensional input image data stream, for example, a single row of sound data. A plurality of MLT transforms can be applied using a parallel bank of forward MLT processors or inverse MLT processors as part of a one dimensional MLT architecture. The one dimensional MLT architecture can be used as part of two dimensional image compression and decompression system operating on blocks of data of the input data stream organized as a two dimensional image. Each of the forward processors and inverse processors in the bank of parallel MLT processors are identical facilitating a modular design having localized interconnections to reduce the overall number of interconnections in the MLT system.

The forward processors and inverse processors are preferably implemented as a high speed pipeline architecture of a fast MLT with few interconnects and multipliers. The preferred form is practical for VLSI implementation for image compression and decompression system. The VLSI pipeline architecture can be implemented using field programmable gate array and VLSI application specific integrated circuits designs. This preferred form of the invention includes designs that use the least number of multipliers having the least number of interconnects using a modular pipeline architecture. The preferred bank of eight parallel processors (inverse processors or forward processors) are for processing preferred 8×8 pixel blocks. The forward MLT processors use only three multipliers in each of the forward MLT processors and only one multiplier in each of the inverse MLT processors. One important advantage of the MLT inverse processors and forward processors is the use of small number of multipliers, particularly, in the inverse processor. This is due migrating multiplier functions originally in the inverse processor with the window multiplier in the inverse MLT architecture. The inverse processor and forward processor are modular in that all of the processors in a bank of parallel processors are identical in structure but independent in function. Preferably eight forward processors in the forward MLT architecture and eight inverse processors in the inverse MLT architecture are used for fast processing speed. However, if the processing speed is not the major design requirement, then only one MLT processor need be used for the respective forward and inverse MLT architecture even for processing a two dimensional input data stream. A change from a one MLT processor design to a bank of parallel processors does not affect other parts of MLT architecture designs.

The preferred MLT process and implementation obviates many of the artifacts that are introduced by some of the standard compression techniques. The new MLT reduces blocking artifacts and has excellent resistance to errors. This MLT technique encapsulates the favorable convolution feature of the wavelet transforms and produces images which, when compressed, for example, at ten to one, and decompressed, compare very favorably using error statistics, classification accuracy and visual quality metrics, to the original uncompressed input image, yet can transform block wise input data for fast computation. These and other advantages will become more apparent from the following detailed description of the preferred embodiment.

DETAILED DESCRIPTION OF THE PREFERRED EMBODIMENT

Figure 1:
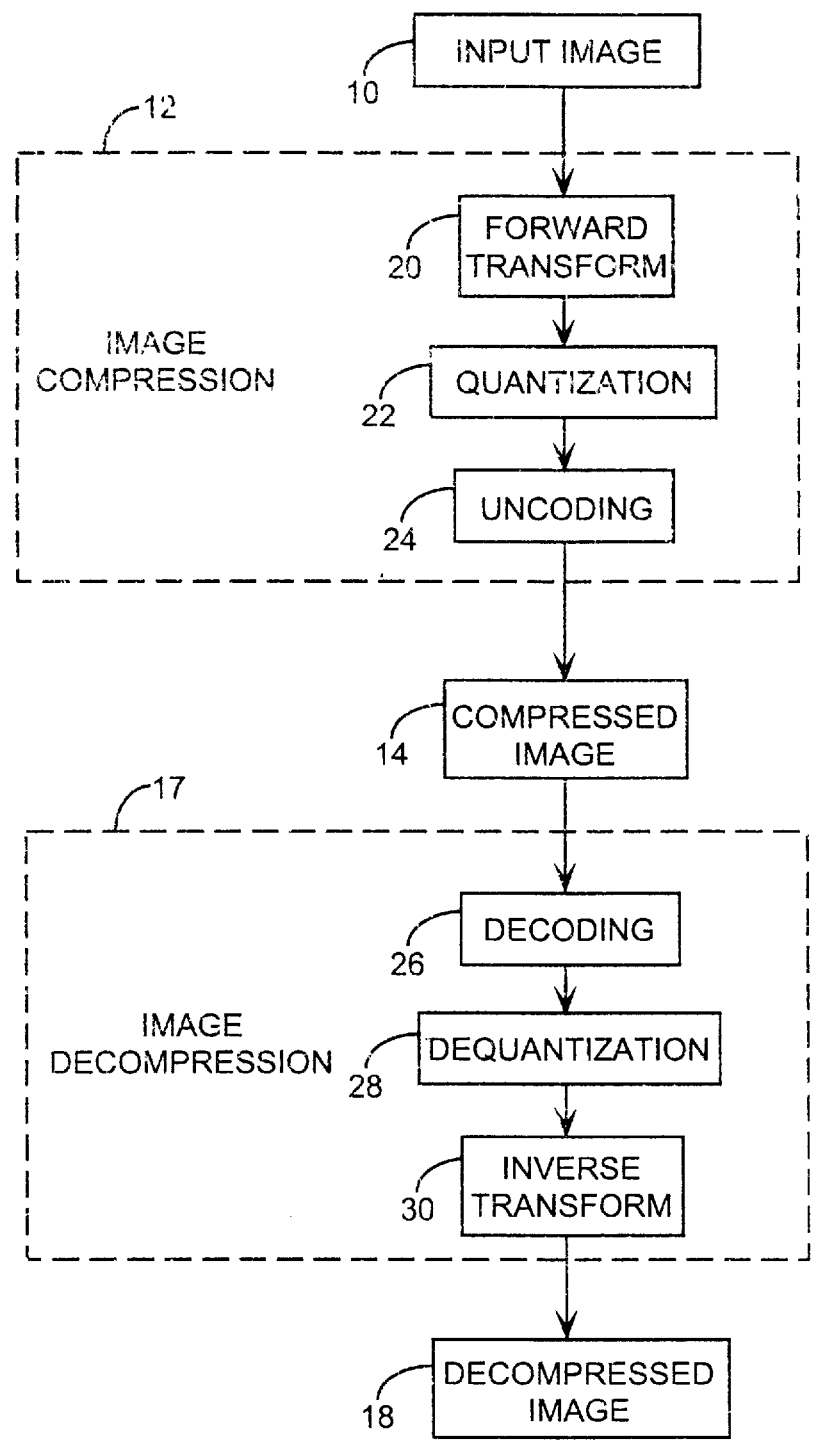
FIG. 1 is a prior art block diagram of the image compression decompression process.

An embodiment of the invention is described with reference to the figures using reference designations as shown in the figures. The invention replaces the discrete cosine transform (DCT) in the Joint Photographic Experts Group (JPEG), with the Modulated Lapped Transform (MLT) with overlapping windows. Referring to FIG. 1, image compression methods are preferably incorporated into a conventional compression system including prior art functions. An input image 10 is compressed by image compression 12 into a compressed image 14 which is decompressed by image decompression 17 into a decompressed image 18. The image compression 12 includes the forward transform 20, quantization 22 and encoding 24 to provide a compressed output image 14. Image decompression 17, including decoding 26, dequantization 28 and inverse transform 30, as well-known, produces the decompressed image 18 which reproduces the input image. The invention lies in improved forward transform 20 and inverse transform 30, and more particularly is directed to a preferred MLT design that is practical for VLSI implementation.

The preferred form of the invention is an electronic hardware implementation of both the one-dimensional and two-dimensional MLT for forward and inverse transformations. The preferred implementation relies upon block processes for image compression and decompression. The image is segmented into blocks, for example, image blocks of 8×8 pixel by pixel squares, but other block sizes could be used as well, as a simple extension of the methods for use with other block sizes. Both the one-dimensional forward and inverse MLT preferably have the same block length, for example, eight pixels. The one-dimensional implementations is suitable for both image data compression and audio data compression because the block length does not restrict to a power of two. The preferred block length of 8 samples is used, but the same method applies equally well to any other integer block lengths.

The window function of the MLT kernel is a half sine function spanning N pixels, where N/2 is the block length. Window functions of other forms, such as a local cosine window could be used as well. The window function is mathematically defined by a W(n) equation. $W(n)=\sin[(2n-1)\pi/(2N)]$ for n=1,2,3, . . . N, for example, N=16 for a window length of 16. In order to process boundary conditions at the start and end of each scan line in the input data stream, the first and the last window functions are different from the rest.

Figure 2:
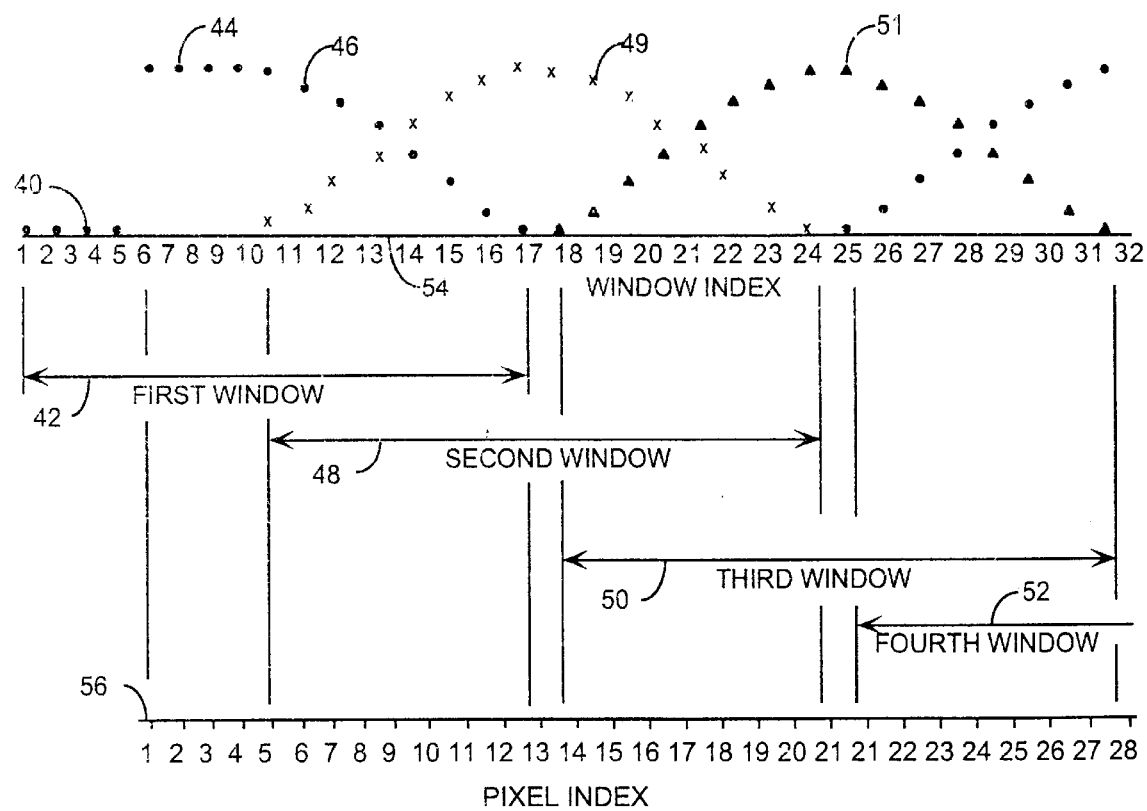
FIG. 2 depicts the shape of the window function over window index of modulated lapped transform (MLT) covering a beginning boundary condition and shows the relationship between the window function and input pixels of an input data stream.

Referring to FIG. 2, the first four points 40 of the first window 42 are zeros, the next four points 44 of the first window 42 are unities, and the latter half 8 points 46 is the latter half of the half-sine function given by the W(n) equation. The input image is processed by windows each having a plurality of blocks, having predetermined window and block lengths, for example, a block length of 8 points, and a window length of 16 points with each window having overlapping points, for example, one overlapping block of 8 points, from one window to the next. The second window 48 having the half sin function 49 overlaps the first window 42 and the third window 50. The third window 50 having half sin function 51 overlaps the second window 48 and the fourth window 52, and so on. Each window is a mirror image of the preceding window. Starting from the second window 48 to the one next to the last, each window is a complete half-sine function 49 or 51 as given by the W(n) equation, but overlaps with the previous window by the preferred 8 points of an overlapped block of points. The last window, not shown, also has the last four points set to zero for processing the ending boundary condition. Each window preferably operates on 16 points referenced to a window index 54 which is translated to a pixel index 56 by the four beginning boundary window index points 40. The pixel index 56 does not include pixel points corresponding to the first and last four window index points.

Figure 3:
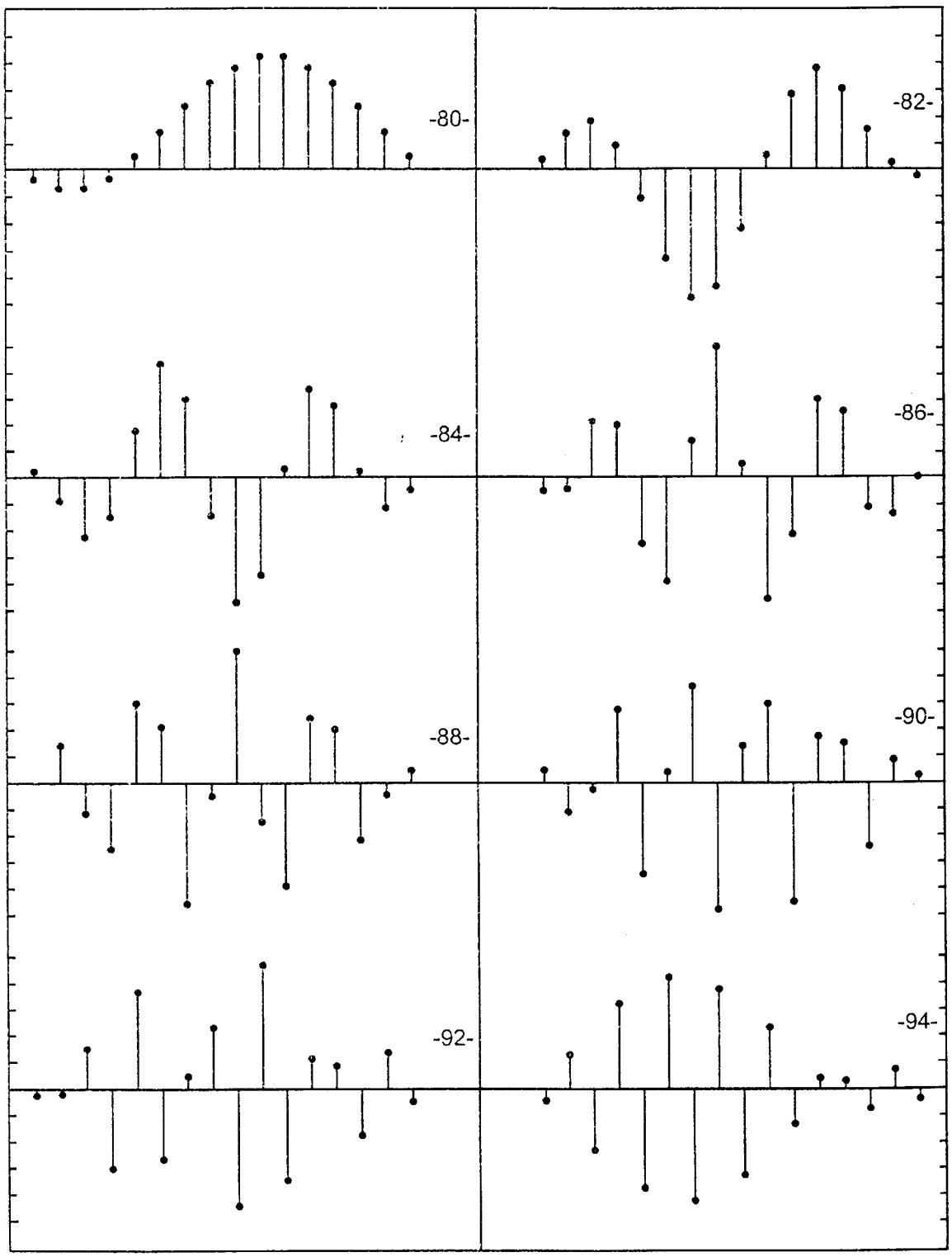
FIG 3 shows weighted sequences for eight modulated lapped transforms depicting an overall window function modulated by a modulation function.

Referring to FIG. 3, the MLT kernel provides a modulation function F(k,n) of the window function W(n). Weighing coefficients are defined by the product of the modulation function F(k,n) and the window function W(n). The MLT is a transform having a modulation function and a window function operating on overlapping blocks of input data. The preferred MLT has a discrete cosine modulation function and a half sine wave window function, but other modulation and window functions could be implemented using window and input data multiplication and using IIR filters of the modulation function. For examples, Gabor wavelet and local cosine transforms could also be implemented with a window product and an IIR filter operating or that window product. The MLT, Gabor wavelet and local cosine transforms are defined by weighing coefficients. The preferred implementation has weighing coefficients of eight MLTs having values listed in the table of weighing coefficients and also plotted in FIG. 3.

The multiplication with input. pixels starts at the fifth window index point of the first window for processing the beginning boundary condition. The window multiplication provide a W(n)X(n) window product on which the MLT modulation function then operates to generate the forward MLT data according to the following forward MLT architecture.

The forward MLT architecture is controlled by a clock 100 and counters 102 for providing address, clock and timing signals. The X(n) input data stream 104 is received and stored into a buffering FIFO 106. The input data stream might not be synchronous with the MLT forward architecture, and input FIFO storage provides necessary buffering. The X(n) input data stream 104 is to be multiplied by scaled window values defined by the window function W(n) of stored values. The window value may include a scaling factor. Except for the first four and the last four pixels of a scan line, each pixel is multiplied twice by different scaled window values due to the overlapping of the windows. To maintain overall constant data synchronism, latches, 108ab are used with the FIFO 106 for double buffering because the latched data rate from latches 108ab is twice as slow as the input data rate out of the input FIFO buffer 106. Due to the symmetry of the window function, only the first half of the scaled window values need be stored in the ROM 110. As the input data stream X(n) is read from the FIFO 106, each block of eight pixel points are stored into one and then the other of the latches 108ab. Each latch 108ab preferably stores, for example, data for eight pixel points each defined by a plurality of bits, for example, eight data bits. Each block of pixels is stored in the latches 108a or 108b for two window periods because each block is used twice, once for a first window, and once for a succeeding overlapping window. A multiplexer 112 is used to alternately select one of the stored blocks from latches 108a and 108b and presents the block of input data X(n), pixel by pixel, to a window multiplier 114 which respectively multiplies, window value by window value, the set of window values

| TABLE OF WEIGHING COEFFICIENTS | | | | | | | | |
| --- | --- | --- | --- | --- | --- | --- | --- | --- |
| n | MLT-1 | MLT-2 | MLT-3 | MLT-4 | MLT-5 | MLT-6 | MLT-7 | MLT-8 |
| 1 | −0.03 | +0.04 | +0.01 | −0.05 | +0.00 | +0.05 | −0.02 | −0.04 |
| 2 | −0.07 | +0.14 | −0.09 | −0.04 | +0.14 | −0.11 | −0.01 | +0.13 |
| 3 | −0.07 | +0.18 | −0.23 | +0.21 | −0.11 | −0.02 | +0.15 | −0.23 |
| 4 | −0.03 | +0.09 | −0.15 | +0.20 | −0.25 | +0.28 | −0.30 | +0.32 |
| 5 | +0.04 | −0.11 | +0.18 | −0.25 | +0.30 | −0.34 | +0.37 | −0.38 |
| 6 | +0.13 | −0.34 | +0.44 | −0.39 | +0.21 | +0.04 | −0.28 | +0.42 |
| 7 | +0.23 | −0.48 | +0.30 | +0.14 | −0.46 | +0.37 | +0.05 | −0.42 |
| 8 | +0.32 | −0.44 | −0.14 | +0.50 | −0.05 | −0.48 | +0.23 | +0.38 |
| 9 | +0.38 | −0.23 | −0.48 | +0.05 | +0.50 | +0.14 | −0.44 | −0.32 |
| 10 | +0.42 | +0.05 | −0.37 | −0.46 | −0.14 | +0.30 | +0.48 | +0.23 |
| 11 | +0.42 | +0.28 | +0.04 | −0.21 | −0.39 | −0.44 | −0.34 | −0.13 |
| 12 | +0.38 | +0.37 | +0.34 | +0.30 | +0.25 | +0.18 | +0.11 | +0.04 |
| 13 | +0.32 | +0.30 | +0.28 | +0.25 | +0.20 | +0.15 | +0.09 | +0.03 |
| 14 | +0.23 | +0.15 | +0.02 | −0.11 | −0.21 | −0.23 | −0.18 | −0.07 |
| 15 | +0.13 | +0.01 | −0.11 | −0.14 | −0.04 | +0.09 | +0.14 | +0.07 |
| 16 | +0.04 | −0.02 | −0.05 | +0.00 | +0.05 | +0.01 | −0.04 | −0.03 |

Figure 4:
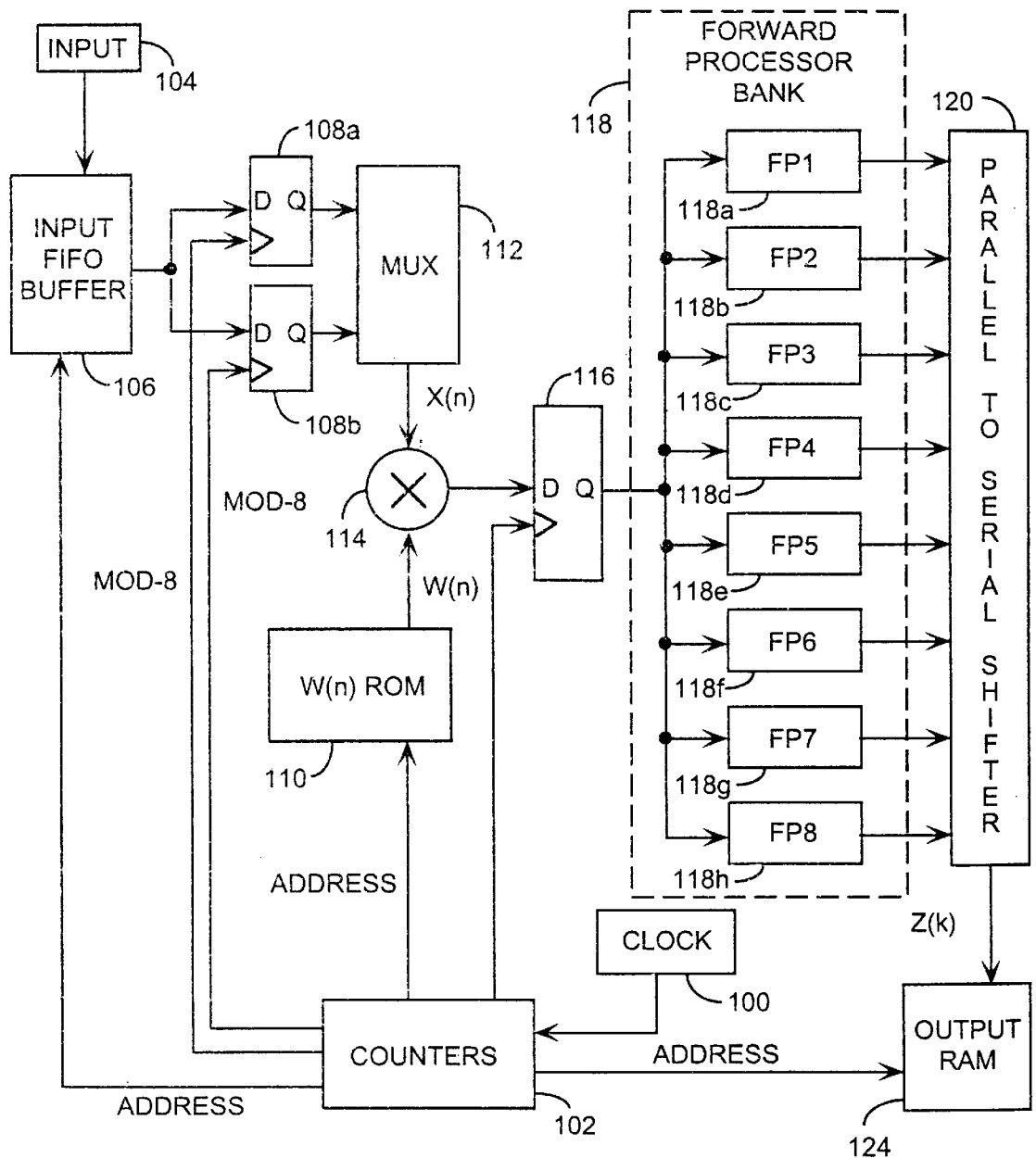
FIG. 4 is a block diagram of a forward MLT architecture having a window multiplication function and using a bank of forward MLT processors of FIG. 5.

Referring to FIG. 4, a word-serial, bit-parallel, pipeline architecture is shown for a one-dimensional forward MLT architecture. The forward MLT architecture can be implemented using conventional electronic modules. The preferred one-dimensional forward MLT architecture is implemented based upon mathematical manipulation of the modulation function. The input pixel data stream, X(n) is first multiplied, pixel by pixel, by a window function W(n).

from the ROM 110 by the two overlapping blocks of input data X(n). The multiplier 114 may be implemented as a carry save adder. For each point stored in the latches 108ab, the multiplexer 112 provides the data point twice for succeeding overlapping windows, and the multiplexer 112 has a data rate twice that of the data rate from the FIFO 106. The 16 input data points are respective multiplied by 16 window values W(n) stored in the ROM 110.

The 16 window values calculated from equation W(n) for N=16, are W(1)=0.09802, W(2)=0.29028, W(3)=0.47140, W(4)=0.63439, W(5)=0.77301, W(6)=0.88192, W(7)=0.95694 W(8)=0.99518, W(9)=0.99518, W(10)=0.95694, W(11)=0.88192, W(12)=0.77301, W(13)=0.63439, W(14)=0.47140, W(15)=0.29028, W(16)=0.09802. W(1–4) for the first four points of the first window, and W(13–16) for the last four points of the last window having a value of zero for processing the beginning and ending boundary conditions. W(5–8) of the first window and W(9–12) of the last window having a unity value for processing the beginning and ending boundary conditions.

The output of the window multiplier 114 is the window product W(n)X(n) for n=1,2,3,→,N, for each window transformed. The window product W(n)X(n) preferably has 16 window product values to be successively latched up in the latch 116. The latch 116 presents the 16 window product values, one-by-one as a word-serial data stream to forward MLT processors 118a–h. The window product values are fed serially, point by point, into all 8 forward processors 118a–118h. The forward processor 118a–118h is a bank of parallel forward processors 118 for performing the one-dimensional MLT. Each of the eight forward processors 118a–h receive the same 16 product values when converting the 16 product values into transformed outputs Z(k). Each of the forward processors 118 convert the 16 window product values into one of the outputs Z(k). A block of 8 transformed outputs from the forward processor 118a–h are serially shifted by a shifter 120 into an output RAM 124 for storing transformed blocks Z(k). The parallel to serial shifter 120 consists of eight latches such that the output of each processor 118a–h can be latched up simultaneously and then shifted serially to the RAM 124. For each input block of input data X(n) processed, that is, for each window of overlapping blocks, a respective transformed block of outputs Z(k) is stored in the RAM 124. The RAM 124 can then be accessed by a quantization process 22 and an encoding process 24 to provide a compressed image 14, as shown in FIG. 1. Each forward processor operates independent of the remaining forward processors enabling a modular configuration of the one dimensional MLT architecture.

The one-dimensional MLT can be expressed for each window by a Z(k) equation containing the window product term W(n) X(x) and based upon a manipulation of the modulation function F(k,n) resulting in a infinite impulse response filter implementation. The Z(k) equation is for n=1,2,3→N, the window size, e.g. 16, and for k=1,2,3,→M, the block size, e.g. 8, where M=N/2 for a two block window size. The outputs Z(k) are a block of MLT transformed output values e.g. 8 values, for each window transformed. The modulation function F(k,n) of the MLT kernel is defined by the F(k,n) equation. Based on the periodic property of the MLT kernel, the Z(k) equation is manipulated and rewritten for every block as a function of the window product W(n) X(n).

$$Z(k)=A(k)r(N)-B(k)r(N-1)$$

$$r(n)=C(k)r(n-1)-r(n-2)+W(n)X(n)$$

The r(n) equation represents a stable, second order infinite impulse response (IIR) digital recursive filter. The initial conditions of r(n) are r(−1)=r(0)=0. The transform values of A(k), B(k), and C(k) for k=1 to 8 are listed in the table of transform values. Each forward processor (FP) 118a–h respectively uses an A(k), B(k) and C(k) value for transformation of the window product W(n)X(n) into the Z(k) output. The forward modulation function is implemented as a recursive IIR filter operating on the W(n)X(n) window product in combination with additional arithmetic functions, such as, the A(k) and B(k) multiplications.

Table of Transform Values

| k | FP | A (k) | B (k) | C (k) |
|---|---|---|---|---|
| 1 | 1 | 0.773010453 | 0.634393284 | 1.961570561 |
| 2 | 2 | −0.471396737 | −0.881921264 | 1.662939225 |
| 3 | 3 | −0.956940336 | −0.290284677 | 1.111140466 |
| 4 | 4 | 0.098017140 | 0.995184727 | 0.390180644 |
| 5 | 5 | 0.995184727 | −0.098017140 | −0.390180644 |
| 6 | 6 | 0.290284677 | −0.956940336 | −1.111140466 |
| 7 | 7 | −0.881921264 | 0.471396737 | −1.662939225 |
| 8 | 8 | −0.634393284 | 0.773010453 | −1.961570561 |

Figure 5:
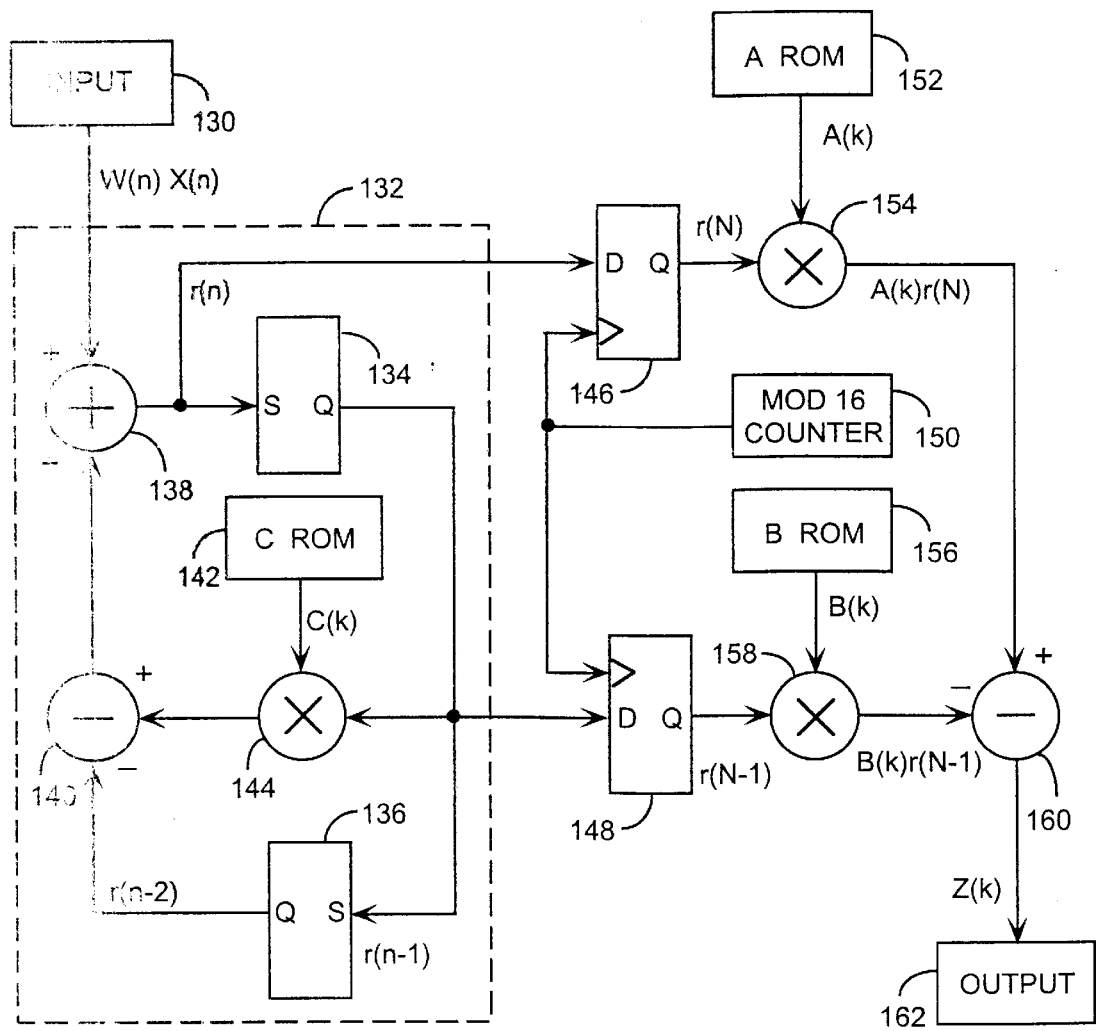
FIG. 5 is a block diagram of a forward MLT processor having an internal infinite impulse response (IIR) filter and internal A and B multiplications.

Referring to FIG. 5, a forward processor is in part a hardware realization of the recursive function r(n) operating on the window product W(n)X(n) of the input 130 to provide a Z(k) transformed output indexed by k for each window. The r(n) equation is realized by a second order infinite impulse response (IIR) filter 132 providing r(n) and r(n−1) recursive signals. The IIR filter 132 comprises flip flops 134 and 136 for respectively providing the r(n−1) signal and r(n−2) signal. The IIR filter 132 also comprises an adder 138 for providing the r(n) signal, a subtractor 140, a C ROM 142 and an multiplier 144. The multiplier 144 is used to perform the multiplication of the C(k) value to the r(n−1) signal to provide a C(k)r(n−1) product from which is subtracted the r(n−2) signal by the subtractor 140 providing a difference which is added to the input W(n)X(n) to recursively provide the r(n) signal. The adder 138 can be a full carry look ahead adder for adding the input W(n)X(n) to the output of the multiplier 144. The IIR filter 132 operates recursively on sixteen clock cycles, one for each index point of the current window, with flip flops 134 and 136 being clocked on each clock cycle. After sixteen clock cycles when the IIR filter 132 has recursively generated the r(n) and r(n−1) output signals sixteen times, latches 146 and 148 respectively temporarily latch r(N) and r(N−1) outputs at n=N=16 when clocked by a mod sixteen counter 150. An A ROM 152 provide a A(k) value for arithmetic multiplication with the r(N) latched output from the latch 146 by multiplier 154 providing an A(k)r(N) signal. A B ROM 156 provide a B(k) value for arithmetic multiplication with the r(N−1) latched output from the latch 148 by B multiplier 158 providing an B(k)r(N−1) signal. The multiplier 154 multiplies A(k) to r(N) and provides an A(k)r(N) output signal and the multiplier 158 multiplies B(k) to r(N−1) and provides a B(k)r(N−1) output signal. In each forward processor 118, the IIR filter 132 circulates data in a filter loop N times, for example sixteen times for a window length of sixteen. The respective C(k) transform value is a constant value. When n=N, e.g., after sixteen clock cycles, the r(N) and r(N−1) outputs of the IIR filter 132, are latched up by the two latches 146 and 148 used for multiplication in multipliers 154 and 158 respectively. The two latches 146 and 148 are controlled by the mod-16 counter 150 operating in synchronism with the input 130 of sixteen window product values W(n)X(n). After the latches 146 and 148 are latched up on the sixteenth clock cycle, then the two flip flops 134 and 136 are reset to restart the sixteen clock circulation at the zero initial values for the next input window. A subtractor 160 provides the Z(k) transformed output 162 by subtracting the B(k)r(N−1) output of B multiplier 158 from the A(k)r(N) output of the A multiplier 154.

Referring to the table of transform values, and when disregarding the signs and order, all of the B(k) values are included in the A(k) values. The C(k) values are antisymmetrical, and only the absolute values of A(k) and the first four values of C(k) are needed to be stored in binary format to perform the multiplication operations. The A(k), B(k) and C(k) forward transform values are multiplication coefficients including signs and are different for each of the eight different forward processors. The A(k), B(k) and C(k) transform values can be respectively stored in the A, B and C ROMs 142, 152 and 156. The A, B, and C ROMs 142, 152 and 164 could be implemented as one system ROM to which all of the forward processor 118 are connected. However, each forward processor requires only one A(k) value, one B(k) value and one C(k) value which can be stored in the respective A ROM, B ROM, and C ROM or stored in a single ROM storing all three A(k), B(k) and C(k) values local to the respective forward processor, so that the interconnections between the plurality of forward processors are reduced.

The operating speed of the forward processor 118 is limited by the C multiplier 144 because multiplier 144 executes a multiplication sixteen times for every multiplication of the A and B multipliers 154 and 156. For operation at higher speed and without the need of ROM to store the transform values, the distinctive transform coefficients listed in the table of transform values can be represented by canonic signed-digit (CSD) codes. The resulting hardware implementation includes a fast adder with fused inputs for higher speed operations without the use of ROMs. The canonic signed-digit (CSD) codes for C(k) are: $C(1)=2-2^{-5}-2^{-7}+2^{-11}+2^{-13}$; $C(2)=2-2^{-2}-2^{-4}-2^{-6}-2^{-7}-2^{-10}-2^{-13}$; $C(3)=1+2^{-3}-2^{-6}+2^{-9}-2^{-13}$; and $C(4)=2^{-1}-2^{-3}+2^{-6}-2^{-11}$. The CSD codes for A(k) are: $A(1)=1 -2^{-2}+2^{-5}-2^{-7}-2^{-11}$; $-A(2)=2^{-1}-2^{-5}+2^{-8}-2^{-10}-2^{-12}$; $-A(3)=1 -2^{-4}+2^{-6}+2^{-8}-2^{-13}$; $A(4)=2^{-3}-2^{-5}+2^{-8}+2^{-11}-2^{-13}$; $A(5)=1 -2^{-8}-2^{-10}$; $A(6)=2^{-2}+2^{-4}-2^{-6}-2^{-7}+2^{-10}+2^{-12}$; $-A(7)=1 -2^{-3}+2^{-7}-2^{-10}$; and $-A(8)=2^{-1}+2^{-3}+2^{-7}+2^{-9}-2^{-12}-2^{-13}$. The CSD codes use the $2^{-f}$ notation to denote ½ to the exponent of f. If a number is multiplied by $2^{-f}$, it is equivalent to shifting the number to the right f bits in binary arithmetics.

The multiplication of the CSD coded coefficients with the input r(n) can be implemented with combinatory logic, which can operate at higher speed without the need to store the coefficients in ROM. Moreover, the number of adders used in CSD code is less than those need in conventional multiplier designs. For example, let the 2's complement of r(n−1) be given as (s $b_{18}$ $b_{17}$ $b_{16}$ $b_{15}$ $b_{14}$ $b_{13}$ $b_{12}$ $b_{11}$ $b_{10}$ $b_9$ $b_8$ $b_7$ $b_6$ $b_5$ $b_4$ $b_3$ $b_2$ $b_1$ $b_0)_2$, where s is the sign bit. Then the multiplication of the C(1) 1.961570561 value with r(n−1) becomes $(2-\frac{1}{32}-\frac{1}{128}+\frac{1}{2048}+\frac{1}{8192})$ times r(n−1), that is, C(k) r(n−1)=(s $b_{17}$ $b_{16}$ $b_{15}$ $b_{14}$ $b_{13}$ $b_{12}$ $b_{11}$ $b_{10}$ $b_9$ $b_8$ $b_7$ $b_6$ $b_5$ $b_4$ $b_3$ $b_2$ $b_1$ $b_0)_2$−(s 0 0 0 0 0 $b_{17}$ $b_{16}$ $b_{15}$ $b_{14}$ $b_{13}$ $b_{12}$ $b_{11}$ $b_{10}$ $b_9$ $b_8$ $b_7$ $b_6$ $b_5$ $b_4)_2$−(s 0 0 0 0 0 0 0 $b_{17}$ $b_{16}$ $b_{15}$ $b_{14}$ $b_{13}$ $b_{12}$ $b_{11}$ $b_{10}$ $b_9$ $b_8$ $b_7$ $b_6)_2$ +(s 0 0 0 0 0 0 0 0 0 0 0 $b_{17}$ $b_{16}$ $b_{15}$ $b_{14}$ $b_{13}$ $b_{12}$ $b_{11}$ $b_{10})_2$ +(s 0 0 0 0 0 0 0 0 0 0 0 0 0 $b_{17}$ $b_{16}$ $b_{15}$ $b_{14}$ $b_{13}$ $b_{12})_2$.

The two's complement binary representation of C(1)r(n−1) can be computed from a summation based on adding r(n−1) to itself after shifting r(n−1) according to the C(1) value as $(2-\frac{1}{32}-\frac{1}{128}+\frac{1}{2048}+\frac{1}{8192})$, that is, by adding r(n−1) that has been shifted to the left once for a multiplication by the value two, minus r(n−1) that has been shifted 5 bits to the right for a multiplication by the value $\frac{1}{32}$, minus r(n−1) that has been shifted 7 bits to the right for a multiplication by the value $\frac{1}{128}$, plus r(n−1) that has been shifted 11 bits to the right for a multiplication by the value $\frac{1}{2048}$, plus r(n−1) that has been shifted 13 bits to the right for a multiplication by the value $\frac{1}{8192}$. The multiplication of the transform value C(1) by r(n−1) is perfected by shifting r(n−1) and adding the shifted versions of r(n−1) together. The multiplication function can be realized by shifting and adding functions. In this manner, the transform values C(k) can be effectively multiplied using CSD codes and adders. More particularly, the C(k) multiplication can be accomplished by fused multiply-add arithmetic logic units.

The r(n−2) output will be subtracted from the output of the C multiplier 144. With two's complement representation of r(n−2), a fused multiply-add operation of C(1)r(n−1)−r(n−2) can be realized by a digital circuit composed of three rows of carry-save adders, one final carry-propagate adder and a latch in a conventional high-speed pipeline multiply-add unit that operates in fixed-point arithmetics. This fused multiply-add arithmetic logic circuit offers increased multiplication speed because the use of CSD representation of C(1) shortens the levels of addition to three in a pipeline multiplier. The CSD method can be faster than well-known ordinary binary representation of C(1) as C(1)=(1. 1 1 1 1 0 1 1 0 0 0 1 0 1) for the same numerical accuracy as the CSD representation. The ordinary binary representation adder would however use five rows of carry-save adders for the same fused multiply-add operation. Thus, the CSD implementation can shorten the vertical pipeline delays. The use of carry-save adders can avoid the extra delays caused by ripple carry propagation along the horizontal direction in each adder level.

Similar CSD carry-save adder (CSA) implementations can be used for all the other multiplications in the forward and inverse MLT processors. If the multiplication coefficients are approximated by the CSD representations, these CSD codes do not need to be stored in the ROM because the input bits can be hardwired to respective bit inputs indicated by the CSD codes. The nonzero bits are fanouts of the respective bits of r(n) for direct hardwired connections in the fused adder. Thus, multipliers 144, 154 and 158 can be implemented using CSD code in fused multiply adders for increase speed and the A, B and C ROMs 142, 152 and 156 would not be needed. The fused adder implementation offers localized interconnections and design modularity.

The forward MLT architecture of FIG. 4 is characterized as including the multiplication by multiplier 114 of the input stream X(n) with a window function W(n) to form a window product X(n)W(n) on which the forward processor of FIG. 5 operates. The forward MLT processor of FIG. 5 receives the X(n)W(n) window product input into the infinite impulse response filter 132 which transforms the X(n)W(n) window product from the spatial domain into the transform domain. The IIR filter 132 and the additional arithmetic functions combine to implement the modulation function part of the forward MLT. The additional arithmetic functions, such as, multipliers 154, 158 and subtractor 160 are used in the forward MLT processor in combination with IIR filter 132 to complete the forward transformation. However, the additional arithmetic functions, such as, the A and B multiplications 152 and 154, can be migrated about the forward MLT architecture of FIG. 4 and about the bank of forward MLT processors 118 to achieve an equivalent design still characterized by a window product multiplication of the window function and input data stream and characterized by a forward MLT processor comprising an IIR filter operating on the window product of the window function and input data stream in combination with additional arithmetic functions. An equivalent exemplar forward MLT architecture and a corresponding forward processor implementation are respectively shown in FIGS. 6 and 7 demonstrating the equivalent migration of additional arithmetic functions when compared to MLT architecture and forward processors FIGS. 4 and 5.

Figure 6:
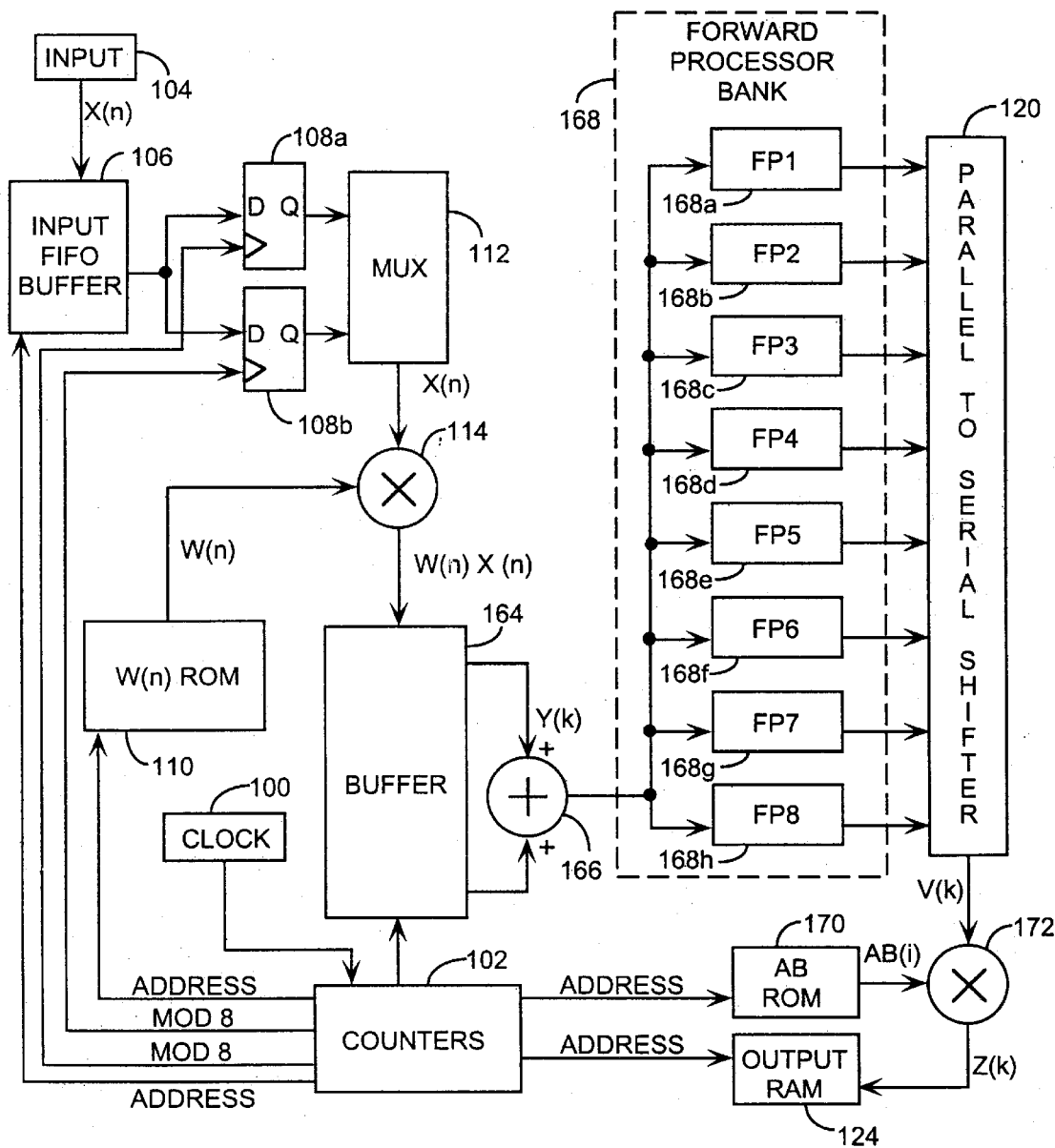
FIG. 6 is a block diagram of a forward MLT system architecture having a window multiplication function, having external A and B multiplication functions, and using a bank of forward MLT processors of FIG. 7.

Referring to FIG. 6, another word-serial, bit-parallel, pipeline architecture is shown for an equivalent one-dimensional forward MLT architecture also based upon the mathematical manipulation of the modulation function. The input pixel data stream X(n) is first multiplied by a window function W(n). The window multiplication provides the W(n)X(n) window product on which the MLT then operates to combine the window function with the modulation function defined by the weighing coefficients.

The forward MLT architecture is controlled by the clock 10c and counters 102 for providing address, clocks and timing signals. The X(n) input data stream 104 is received and stored into the buffering FIFO 106. As the input data stream X(n) is read from the FIFO 106, each block of eight pixel points are stored into one and then the other of the latches 108ab. The multiplexer 112 alternately selects one of the stored blocks from latches 108a and 108b and presents the block of input data X(n), pixel by pixel, to a window multiplier 114 which respectively multiplies, window value by window value, the set of window values from the ROM 110 by the two overlapping blocks of input data X(n). The multiplier 114 may be implemented as a carry save adder. The sixteen input data points are respective multiplied by sixteen window values W(n) stored in the W(n) ROM 110.

The forward MLT architecture has a buffer 164 and an adder 166 providing a window product sum Y(x) communicated to the inputs of the forward processors 168a–h in the bank 168 of parallel forward processors 168a–h. The buffer 164 and adder 166 add two halves of the W(n)X(n) window product together providing the window product sum Y(k) of k block size to the bank 168 of forward processors 168a–h. The buffer 164 and adder 166 inject buffering delays into the pipeline forward MLT architecture. The window product sum Y(k) is fed into the forward processors 168a–168h. Each of the eight forward processors 168a–h receive the same eight window product sin values Y(k) when converting the window product sum Y(k) into an output V(k). A block of eight outputs from the forward processor 118a–h are serially shifted by a shifter 120 providing a block of outputs V(k). The outputs V(k) of the shifter 120 is multiplied by AB values stored in an AB ROM 170 by multiplier 172 for providing the transformed output Z(k). The AB ROM 170 stores eight AB values which are a combination of the A(k) and B(k) transform values. The AB values are derived from the modulation function F(k,n) and are: AB1=0.098, AB2=0.290, AB3=0.471, AB4=0.634, AB5=0.773, AB6=0.882, AB7=0.957, and AB8=0.995. The AB arithmetic functions have been migrated outside of the forward processors 168. The multiplier 172 provides the transformed blocks of outputs Z(k) stored in the RAM 124.

Figure 7:
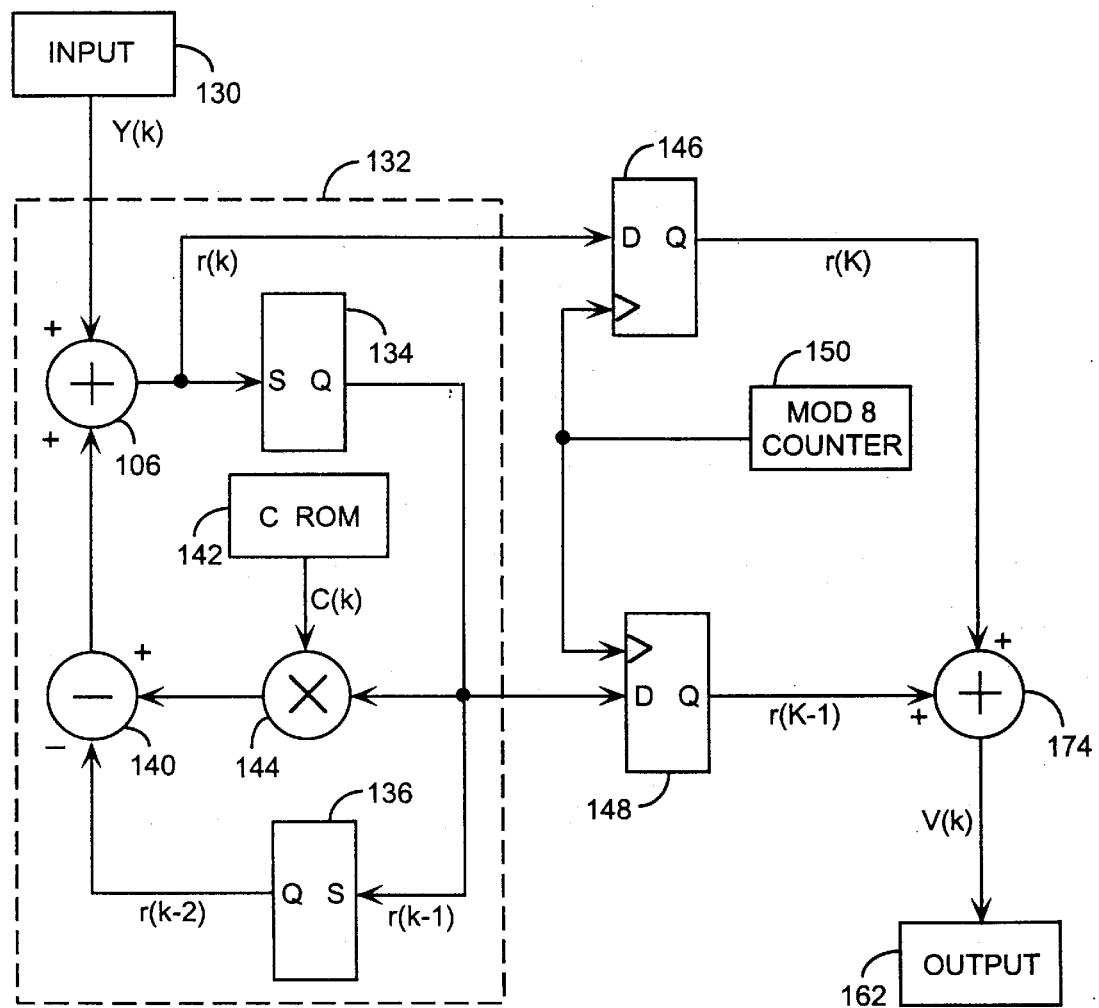
FIG. 7 is a block diagram of a forward MLT processor having an internal IIR filter.

Referring to FIG. 7, another forward processor is also a hardware implementation of a recursive filter function operating on the sum Y(k) to provide a V(k) output for each window transformed. The r(n) equation is again realized by a second order infinite impulse response (IIR) filter 132, comprising the flip flops 134 and 136, the adder 138, the subtractor 140, the C ROM 142 and the multiplier 144, for providing the r(k) and r(k−1) recursive signals latched by the latches 146 and 148 respectively providing temporarily latch r(K) and r(K−1) outputs when clocked by the mod eight counter 150. An adder 174 adds the r(K) and r(K−1) signals to provide a V(k) output.

The forward MLT architecture of FIG. 6 is shown having an AB ROM 170 and a multiplier 172 connected to the parallel to serial shifter 120, whereas, the forward MLT processor 168 of FIG. 7 does not include the A and B multipliers, but only an adder 174. This forward MLT processor 168 of FIG. 7 has an output adder 174, but does not include the A and B multiplication arithmetic functions within the processor 168. The forward MLT requires multiplying an AB(k) value for each forward MLT processor, and hence, the AB ROM 170 would stored eight values. The AB multiplication 172 would be relatively slow using a carry save adder in multiplier 172 as compared to fuse multiply adder, but is simpler in construction using only one multiplier 172 in the forward MLT architecture instead of eight multipliers in the forwards MLT processors. Here, the AB arithmetic functions have been migrated out of the forward MLT processor and into the forward MLT architecture, resulting in a simpler but slower equivalent forward MLT architecture and processors. The forward MLT architecture of FIG. 6 is implemented by generating a window product in the spatial domain of a window function multiplied by the input data stream, and the forward processor is implemented by an IIR operating in the spatial domain on the window product sum Y(k) in combination with additional arithmetic functions operating in the spatial domain. Even though each forward processor of FIGS. 6 and 7 operates independent of the remaining forward processors enabling a modular configuration of the one dimensional MLT architecture, the configurations of FIGS. 4 and 5 are preferred because of the buffering delay through the buffer 164 in FIG. 6.

Referring to FIG. 1, after forward transformation 20, the transformed image of transformed outputs are then quantized 22 and encoded 24 to provide a compressed image 14 using conventional techniques. The compressed imaged 14 may be stored for archival and or transmitted for image decompression 17 which decompresses the compressed image 14 into the decompressed image 18. The decompressed image 18 is thereby reconstructed from the input image 10. Image decompression 17 has decoding 26 and dequantization 28 to provide dequantized image data in blocks for inverse transformation 30 which then provides the decompressed image 18. An inverse transformation 30 is the inverse function of the forward transformation 20. The preferred inverse transformation 26 is an IIR filter MLT implementation based upon the same mathematical manipulation of the MLT modulation function.

Figure 8:
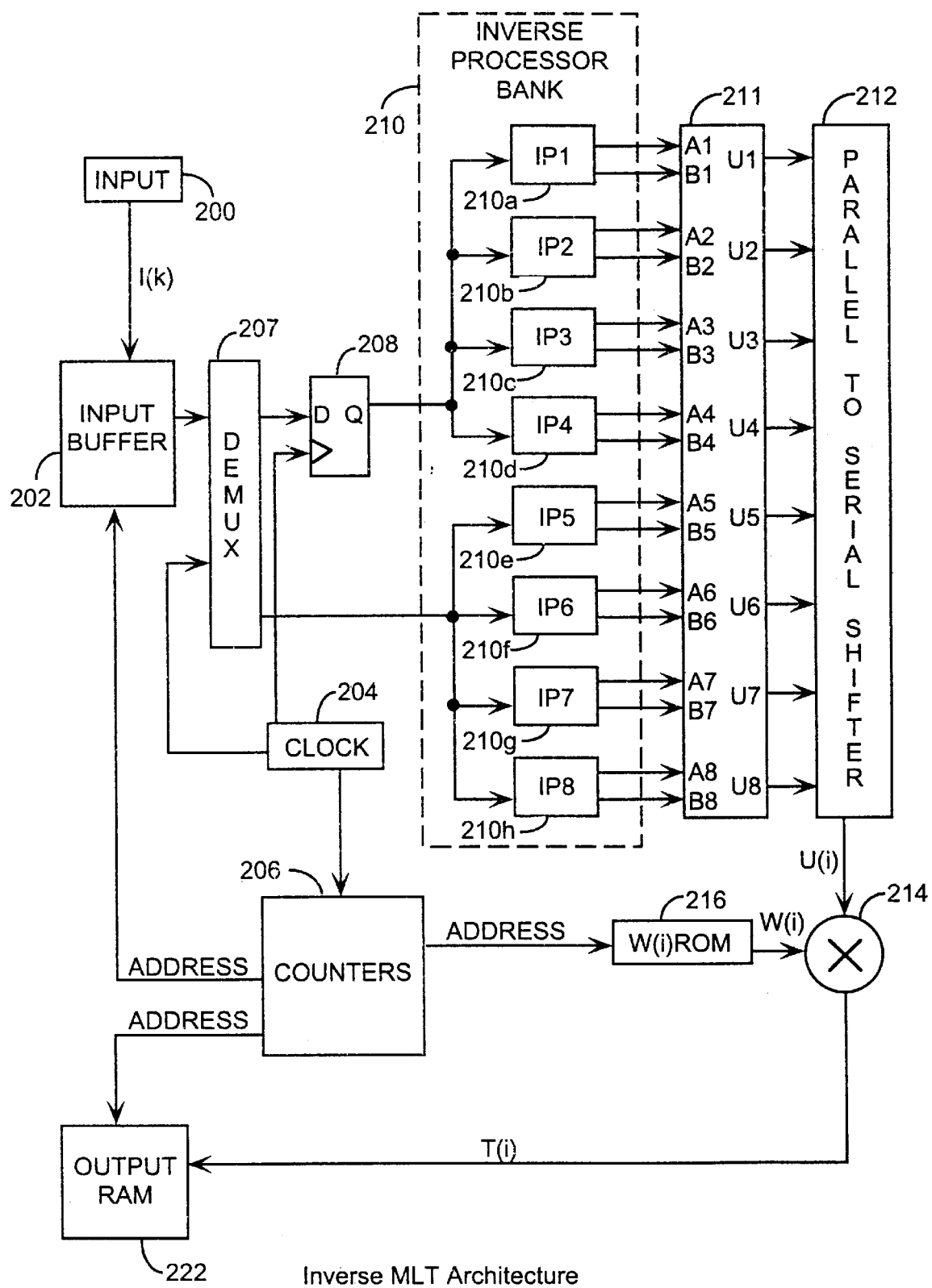
FIG. 8 is a diagram of an inverse MLT architecture having a window multiplication function and using a bank of inverse MLT processors of FIG. 9.

Referring to FIG. 8, a one dimensional inverse MLT architecture receives dequantized image data I(k) as an input 200 which is stored in an input buffer 202. The input I(k) is dequantized coefficient data in the transform domain. Clock 204 and counters 206 provide for system timing and control. The dequantized input data I(k) is a word-serial bit parallel data stream. The dequantized data is arranged in the input buffer 202 by consecutive blocks of dequantized data I(k). The counter 206 provides read addresses that select one pixel at a time from the input buffer 202. The pixels are communicated through a demultiplexer 207. Pixels from a window of two successive blocks are communicated as a window of pixels. The blocks of data in the input buffer 202 are addressed pixel by pixel and alternating between two successive blocks, For example, block-i pixel 1, block 2 pixel 1, block 1 pixel 2, block 2 pixel 2, until block 1 pixel 8, block 2 pixel 8. After communicating this window of pixels for blocks 1 and 2, the next window of pixels of blocks 2 and 3 are communicated in the same manner. The demultiplexer 207 and a latch 208 communicate the pixel data to the bank of inverse processors (IP) 210. The first block of the two block window is communicated to and clocked into latch 208 to provide a one pixel delay. The pixel delay of latch 208 causes the first block to be communicated to the first four inverse processors 210a–d while the second block is synchronously communicated to the second four inverse processors 210e–h. Hence, two blocks of data are respective communicated to two sets of four inverse processors configured as a parallel bank 210 of eight inverse processors 210a–h.

Each of the inverse processor 210a–h provide and A and B output, A1, B1, A2, B2, A3, B3, A4, B4, A5, B5, A6, B6, A7, B7, A8 and B8. These inverse processor outputs are communicated to an adder bank 211 providing outputs U1, U2, U3, U4, U5, U6, U7 and U8. The adder 211 performs eight addition arithmetic functions, U1=A1+A8, U2=A2+A7, U3=A3+A6, U4=A4+A5, U5=B4+B5, U6=B3+B6, U7=B2+B7, and U8=B1+B8. The adder 211 provided 8 inverse transformed outputs U(i) communicated to a parallel to serial shifter 202 providing a block of inverse transformed outputs U(i) for each block of eight dequantized inputs I(k). The outputs U(i) are multiplied by multiplier 214 with eight respective inverse window values W(i) stored in a W ROM 216. The multiplier 214 provides window products that are blocks of decompressed data T(i) in a RAM 222. The multiplier 214 in the inverse MLT architecture can also be a carry save adder.

The inverse window multiplication 214 of an inverse window W(i) prefects the inverse orthogonal multiplication of the window W(n) of the forward MLT architecture. The inverse window W(i) stores 16 values for two consecutive blocks of a window. The first eight window values W(i) for i=1→8, are multiplied by a first transform output U(i) of eight values as a first block of window products stored in the RAM 222 as T(i) decompressed data. The second eight window values W(i+8) are multiplied by a second succeeding transform output U(i+8) of eight values as a second block of window products stored in the RAM 222 as decompressed data T(i+8). The U(i)W(i) window products are stored in sequence as decompressed data T(i). The first half W(1–8) of the 16 inverse window values W(i) is multiplied by a first transformed output U(i) derived by the inverse processors 210a–h from a first block of input data I(k). The second half W(9–16) of the 16 inverse window values W(i) is multiplied by a succeeding second transformed output U(i+8) derived by inverse processors 210a–h from a respective second block of input data I(k+8). Eight values of inverse window values W(i) are multiplied by the eight inverse transformed outputs U(i) to provide a block of decompressed data T(i).

Figure 9:
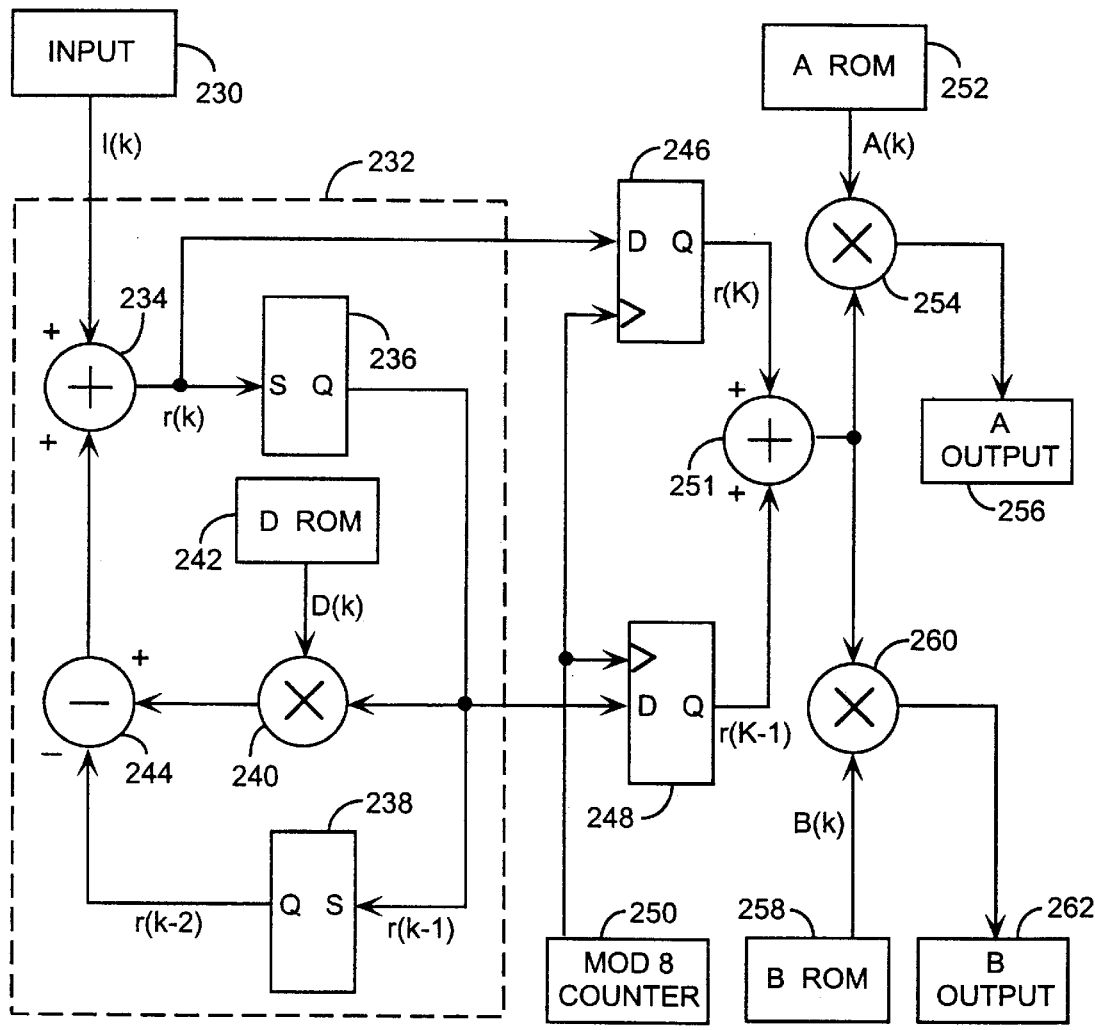
FIG. 9 is a block diagram of an inverse MLT processor having an internal IIR filter and A and B multiplications.

Referring to FIG. 9, each inverse MLT processor receives an input 230 of dequantized data I(k) in the transform domain in blocks of pixel points, for example, eight pixel points, for k=1→8=K. The input data I(k) is fed into an infinite impulse response (IIR) digital recursive filter 232 preferably comprising adder 234 providing an r(k) recursive signal, a flip flop 236 providing an r(k−1) recursive signal, a flip flop 238 providing an r(k−2) recursive signal, a multiplier 240 connected to a D ROM 242 for multiplying the r(k−1) signal with D(k) inverse transform values from the D ROM 242 and for providing a D(k)r(k−1) product signal, a subtractor 244 for subtracting the r(k−2) signal from the D(k)r(k−1) product signal to provide a difference output signal to the adder 234.

The inverse MLT processor of FIG. 9 is replicated as the parallel bank 210 of inverse processors 210a–h as shown in the MLT architecture of FIG. 8. Each of the inverse processors 210 operate on a block of dequantized input data I(k) preferably having eight pixel points. As such, the IIR circulated by clocking signals eight times. The r(k) signal and r(k−1) signal are latched into respective latches 246 and 248 using a clock signal from a mod-8 counter 250. The latched r(K) and r(K−1) outputs are added by adder 251 providing a sum which is multiplied by A(k) transform value stored in an A ROM 252 by multiplier 254 providing an A output 256, and is multiplied by a B(k) transform value stored in a B ROM 258 by multiplier 260 providing a B output 262. The A and B outputs 256 and 262 are added by bank adder 211 in the inverse MLT architecture of FIG. 8 for providing the U(i) inverse transformed output.

The inverse MLT architecture of FIG. 8 is characterized by an inverse window multiplication function 214 on a window of blocks of spatial domain data U(i). The inverse processors of FIG. 9 are characterized by an IIR filter 232 operating on the dequantized data I(k) with additional arithmetic adders and multipliers, including adder bank 211, adder 251, and multipliers; 254 and 260. However, additional arithmetic functions, such as adders 211 and 251 and multipliers 254 and 260, can be migrated throughout the inverse MLT architecture. For example, the eight individual adders of the bank of adders 211 could be respectively migrated into the inverse processors 210a–h. Such a migration of the adder function 211 into the inverse MLT processors would require architecture interconnections, and as such is not preferred. However, such a migration of the bank adder function 211 into the inverse processors 210a–h would clearly show that the MLT demodulation function is implemented by an IIR filter 232 operating on dequantized data I(k) and by additional arithmetic functions providing blocks of data in the spatial domain, and that the inverse window function W(i) operates on spatial domain data to provide decompressed data T(i).

In the forward MLT architecture, a window of two blocks of input data X(n) is forward transformed by firstly multiplying a window function by the input data to provide window products on which an IIR operates to provide a transformed block Z(k). In the inverse MLT architecture, a window of two blocks of dequantized data I(k) and I(k+8) are inverse transformed using an IIR filter into a block of inverse transformed data U(i), and then multiplied by a window function covering a window of blocks of inverse transformed data to provide window products as blocks of decompressed data T(i) of a decompressed image.

The inverse MLT architecture of FIG. 8 is inversely similar to the forward MLT architecture of FIG. 4. The forward MLT architecture of FIG. 4 multiplies the input data stream X(n) by a window function W(n) to provide a window product W(n) X(n) in the spatial domain prior to IIR filtering, whereas the inverse MLT architecture of FIG. 8 multiplies inverse transformed data by an inverse window function W(i) after IIR filtering of dequantized data I(k). The inverse MLT processor of FIG. 9 is inversely similar to the forward MLT processor of FIG. 5. The forward MLT processor has an IIR filter operating on the window product in addition to additional arithmetic functions, including multipliers 154 and 158 and subtractor 160, to provide a transformed output Z(k), whereas the inverse MLT processor has an IIR filter operating on dequantized data in addition to additional arithmetic functions, to provide inverse transformed outputs which are multiplied by an inverse window function to provide window products stored as decompressed data. The arithmetic functions in the inverse MLT can be migrated about the inverse MLT architecture.

Figure 10:
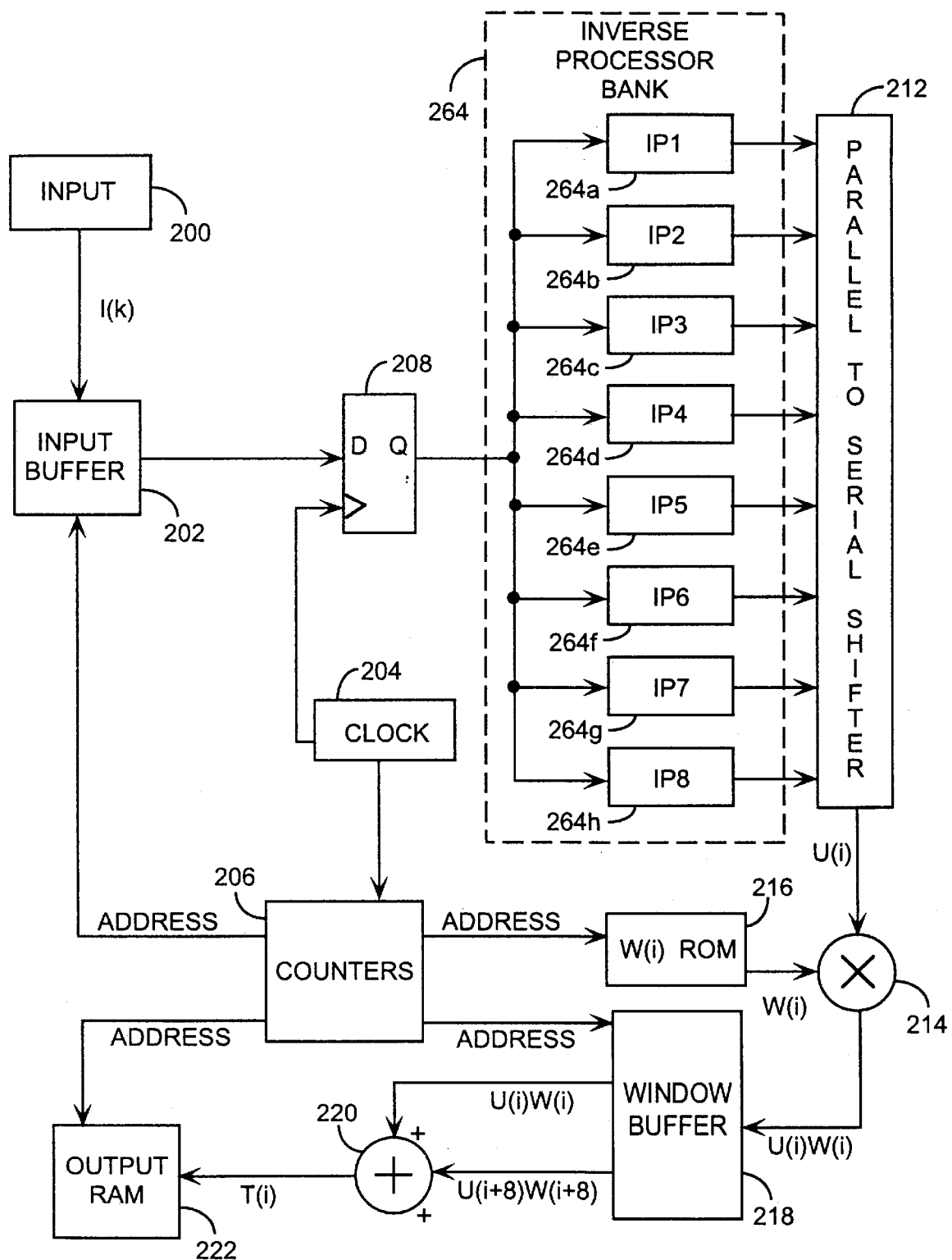
FIG. 10 is a block diagram of an inverse MLT architecture having a window multiplication function and using a bank of inverse MLT processors of FIG. 11.

Referring to FIG. 10, another equivalent one dimensional inverse MLT architecture receives input 200 of dequantized image data I(k) which is stored in an input buffer 202. Clock 204 and counters 206 provide for system timing and control. The dequantized input data I(k) is clocked into latch 208 as a word-serial bit parallel data stream which is then fed into a parallel bank 264 of eight inverse processors 264a–h providing respective inverse transformed outputs U(i) communicated to a parallel to serial shifter 212 providing the eight inverse transformed outputs U(i) for each eight dequantized inputs I(k). The outputs U(i) are multiplied by multiplier 214 with eight respective inverse window values W(i) stored in a W ROM 216.

The 16 inverse window values W(i) and W(i+8) for i equal one to eight, are W(1)=−0.15157, W(2)=+0.51205, W(3)=−0.90223, W(4)=+1.26270, W(5)=−1.53860, W(6)=+1.68791, W(7)=−1.68791, W(8)=+1.53860, W(9)=−1.26270, W(10)=+0.90223, W(11)=−0.51205, W(12)=+0.15157, W(13)=+0.12433, W(14)=−0.27364, W(15)=+0.27364, W(16)=−0.12433. W(i) has positive and negative pairs, and hence, the W ROM 216 need only to store half of the numbers in binary form. However, the inverse window function has different values for the first four starting inputs and the last four inputs in a scan line. W(1)1.99037, W(2)=+1.91390, W(3)=−1.76387, and W(4)=+1.54606 for the first four points of the first window, and W(13)=−1.26884, W(14)=+0.94285, W(15)=−0.58065 and W(16)=+0.19611 for the last four points of the last window for processing the beginning and ending boundary window conditions.

The first half W(1–8) of the sixteen inverse window values is multiplied by a first transformed output U(i) from a first block of input data I(k), and the second half W(9–16) of the sixteen inverse window values is multiplied by a succeeding second transformed output U(i+8) from a respective second block of input data I(k+8). The buffer 218 stores an inverse window comprising two blocks, U(i)W(i) and U(i+8)W(i+8) of window products for subsequent combination by the addition operation of adder 220. The adder 220 adds the two intermediate results U(i)W(i) and U(i+8)W(i+8) to yield the final reconstructed block of pixels T(i). In this manner, a current block of inverse transform data U(i+8) is combined with a previous block of inverse transform data U(i).

The preferred MLT processes beginning and ending boundary conditions. For the first block of eight inverse processor outputs U(1–8), the first four inverse processor outputs U(1–4) multiply with the first four W(1–4), and last four inverse processor outputs U(5–8) multiply with W(9–12) in the natural order and then multiply with W(13–16) in the reversed order to provide eight pixels of decompressed data T(i). For all of next. succeeding blocks of eight inverse processor outputs, the first four inverse processor outputs multiply with W(5–8) in the natural order and with W(1–4) in the reversed order, and the last four inverse processor outputs U(5–8) multiply with W(9–12) in the natural order and then multiply with W(13–16) in the reversed order to give decompressed data T(i) of eight pixels. This process repeats for the remaining blocks except for the last four pixels in the last block. For the last block, the last four inverse processor outputs U(5–8) multiply with w(13–16) in the natural order to yield the last four reconstructed pixels.

Figure 11:
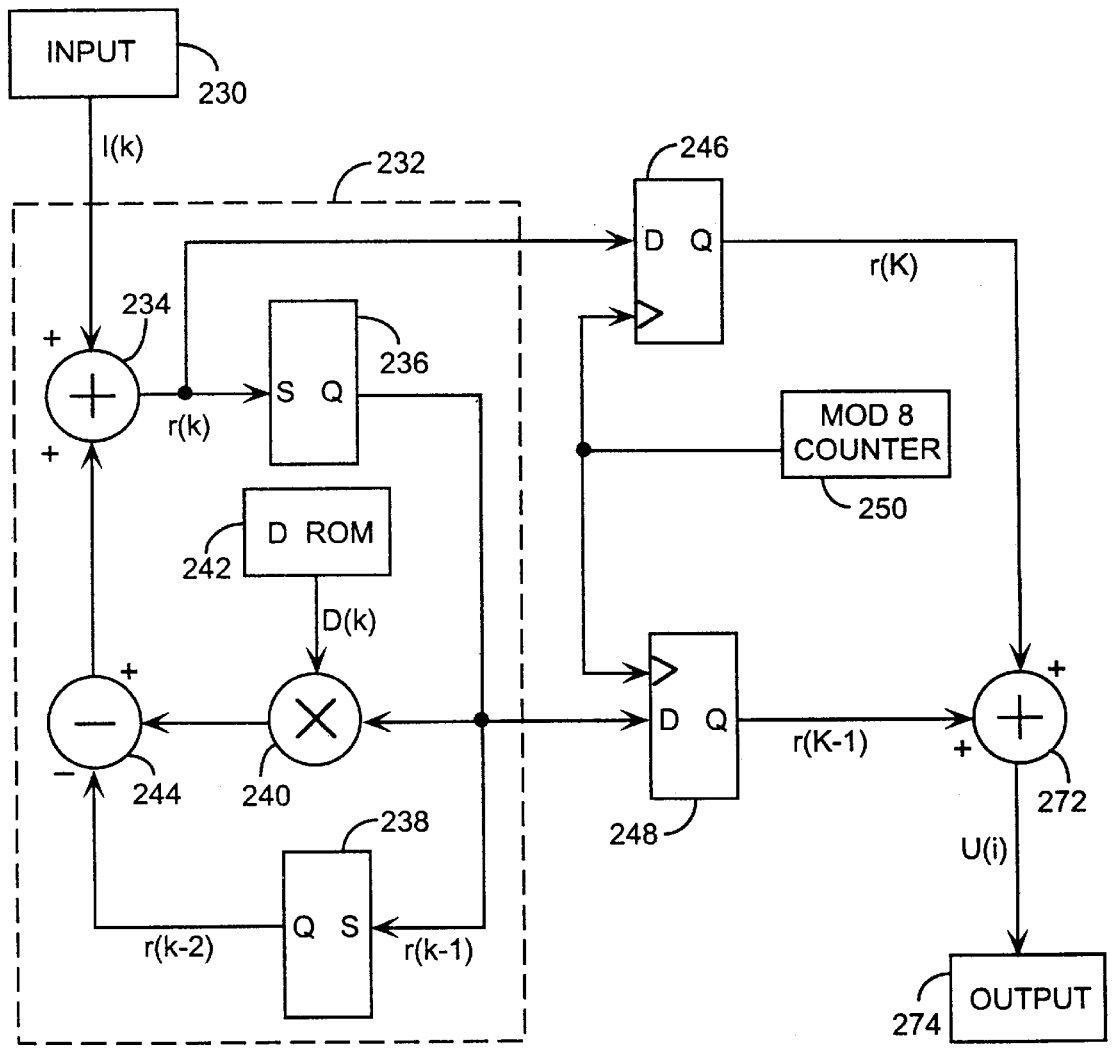
FIG. 11 is a block diagram of an inverse MLT processor having an internal IIR filter.

Referring to FIG. 11, each inverse processor receives an input 230 of dequantized data I(k) in blocks fed into an infinite impulse response (IIR) filter 232 preferably comprising the adder 234, the flip flops 236 and 238 for providing the r(n) and r(n−1) signals, the multiplier 240, the D ROM 242 of D(k) inverse transform values, the subtractor 244 and the adder 234. The multiplication coefficient D(k) are the same as the C(k) forward. transform values except that the signs, + or −, for all of the values are changed. The D(k) inverse transform values are antisymmetrical and hence, the D ROM 242 need only store half of the values in binary form. However, the D ROM contains only one value for each respective inverse processor, and hence, the multiplier 240 in each of the respective inverse processors can also be implemented as a pipeline fused multiply-add logic circuit using CSD codes for increase speed of operation using hardwired input connections with localized interconnections and to avoid the use of the D ROM 242. The inverse MLT processor operates on a block of dequantized input data I(k). The r(k) signal and r(k−1) signal are latched into respective latches 246 and 248 using a clock signal from a mod-8 counter 250. The latched r(K) and r(K−1) outputs are added by an adder 272 providing the U(i) inverse transformed output 274. The inverse processor of FIG. 11 is replicated as the parallel bank 264 of inverse processors 264a–h as shown in the MLT architecture of FIG. 10. As may now be apparent, the arithmetic function of the A and B ROM multiplication 254 and 260 of FIG. 9 have been migrated into the window function W(i) of the inverse MLT architecture of FIG. 10. The inverse MLT architecture of FIG. 8 includes the operation of communicating a window of blocks of dequantized data for generating a respective block of inverse transformed data using the adder bank 211 and A and B multipliers 254 and 260 in the inverse processor, whereas, the equivalent inverse MLT architecture of FIG. 10 include the operation of communicating a block of dequantized data for generating a respective block of inverse transformed data using inverse window values that include the arithmetic multipliers A and B. Hence, the present invention can have many equivalent different architectures that rely upon window multiplication and IIR filtering.

The improved forward MLT architecture of FIGS. 4 or 6, and the improved inverse MLT architecture of FIGS. 8 or 10, can be respectively used as forward transform 20 and inverse transform 30 of FIG. 1, for processing a one-dimensional input data stream. The forward transforms of FIGS. 4 and 5, and the inverse transforms of FIGS. 8 and 9 are preferred because of fast multiplications with modular configurations and because of fast pipelined architecture without a buffing delay. These forward and inverse transforms are well suited for processing a one dimensional input data stream. However, a forward two-dimensional MLT architecture and an inverse two-dimensional MLT architecture based upon the one-dimensional forward and inverse transforms can be used for compressing and decompressing two-dimensional images.

Two dimensional transforms can be achieved using one dimensional transforms. The one dimensional forward MLT is applied to an input image data stream X(n), and the inverse MLT architecture is applied to a dequantized input data stream I(k). The input data stream X(n) and the dequantized input data stream I(k) can be for example two dimensional images with the input data stream X(n) scanned into the forward MLT architecture and the dequantized input data stream I(k) scanned into the reverse MLT architecture. Various scanning schemes can be used, for example, a raster scan, or a peano scan. The simpler row raster scan sends data across horizontal rows, row after row of input data organized as a two dimensional input image. Each row of the input data, having beginning and ending boundaries and plurality of blocks of pixel points, is communicated, row by row, in turn and each row can be transformed into a respective transformed rose of transformed data independently of the next row. The one dimensional MLT can also be equally applied using a column raster scan. A column raster scan sends input data along vertical columns, column after column, of pixel data, when organized as a two dimensional image. Each column of the input data is communicated, column by column, in turn and each can be transformed into respective transformed column of data independently of the next column.

Two dimensional images can be processed using one-dimensional MLTs. A one dimensional MLT can be used to line-by-line transform a two dimensional image in two passes using a raster scanning scheme. For example, during the first pass, the input image is row raster scanned across horizontal rows, row by row, which are independently transformed row by row into an intermediate transformed image of equal size to the input image. During the second pass, the intermediate transformed image is column scanned across vertical columns which are independently transformed column by column into the two dimensional transformed image. For inverse transformation, two passes are also required, a first column by column inverse transformation and then a row by row inverse transformation. The first and second passes require independent processing by, for example, two serially connected MLTs with two respective output RAMs. However, a single MLT is preferably used with an input multiplexer providing input data during the first pass and intermediate transformed data during the second pass.

Figure 12:
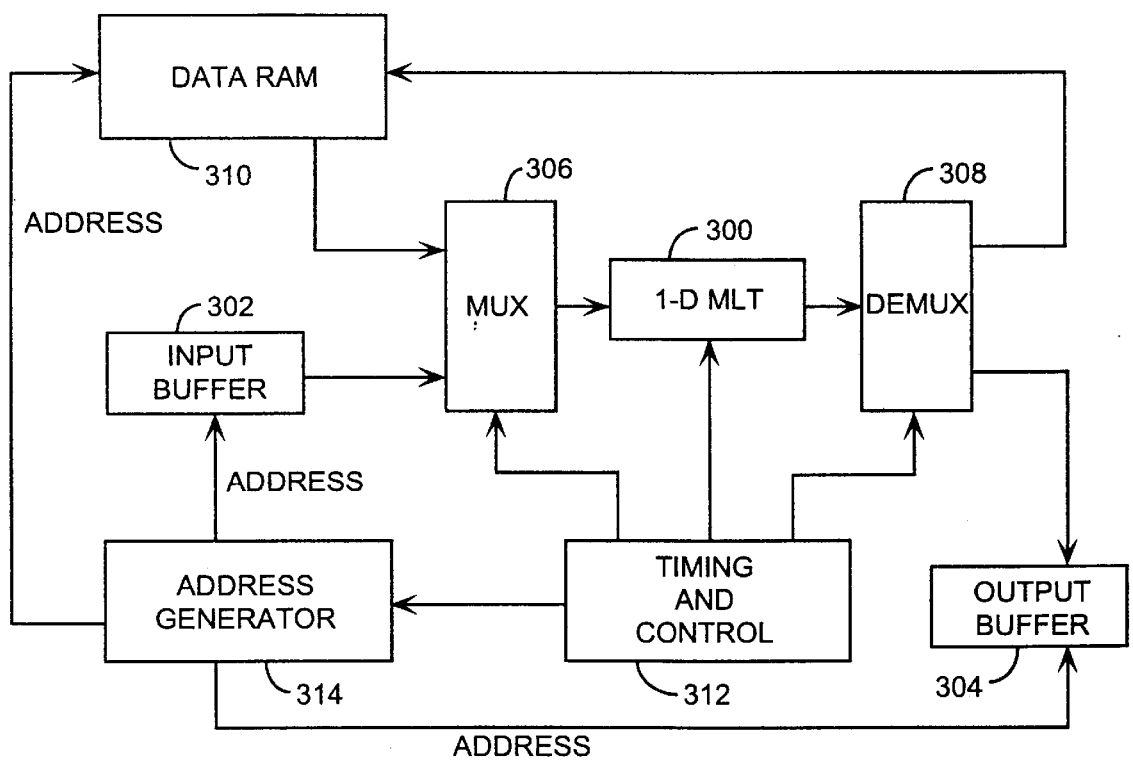
FIG. 12 is a block diagram of a two dimensional MLT architecture.

Referring the FIG. 12, the preferred two-dimensional MLT architecture uses the one-dimensional MLT 300. The two dimensional MLT architecture is a forward two dimensional MLT architecture when the MLT 300 is a one-dimensional forward MLT, such as that shown in FIGS. 4 and 6, with the input data stream X(n) stored in an input buffer 302 and with the forward transformed output data Z(k) stored in an output buffer 304. The two dimensional MLT architecture is an inverse two dimensional MLT architecture when the MLT 300 in a one-dimensional inverse MLT, such as that shown in FIG. 8 and 10, with the dequantized input data I(k) stored in the input buffer 302, and the decompressed image data T(i) stored in the output buffer 304.

An exemplar line-by-line two-dimensional transformation process uses two transform passes, one for the row dimension and another for the column dimension. The line-by-line two-dimensional transformation process requires a first transformation of the input data by rows providing intermediate transformed data, and a second transformation of the intermediate transformed data by columns to provide a two-dimensional transformed output image. Multiplexer 306, demultiplexer 308 and data RAM 310 cooperate together to perform both transformation passes. Timing and control 312 and an address generator 314 provide necessary clocking of the multiplexer 306, demultiplexer 308 and MLT 300 and addressing of the buffers 302 and 304 and RAM 310. The two-dimensional inverse MLT architecture is the same architecture as the forward MLT except that the order of processing of rows and columns is reversed, and that the MLT 300 is an inverse MLT.

During the forward line-by-line two-dimensional transformation, rows of image input data X(n), that is, the row raster scan lines, are communicated row by row from the input buffer 302 through the multiplexer 306 into the one-dimensional forward MLT. The MLT 300 provides forward-transformed rows that are communicated through the demultiplexer 308 and are temporarily stored in the data RAM 310. Each transformation operates on two overlapping blocks of input data and provides one block of output data. Each row of input provides an equal size row of transformed output data. After the first transformation pass by forward MLT 300, the data RAM 310 stores the intermediate transformation image until retrieved column by column. The intermediate transformed data is communicated column by column through the multiplexer 306 back again into the one-dimensional forward MLT 300 through multiplexer 306 during the second pass to provide a forward transformed output communicated through demultiplexer 308 and stored in output buffer 304. Each column of intermediate forward transformed data is transformed into a respective column of forward transformed output data stored in buffer 304.

During the inverse two-dimensional transformation, columns of dequantized input data I(k), that is, the column raster scan lines, are communicated column by column from the input buffer 302 through the multiplexer 306 into the one-dimensional inverse MLT 300. The inverse MLT 300 provides intermediate inverse transformed data that is communicated by column through the demultiplexer 308 and is temporarily stored in the data RAM 310. Each transformation operates on two overlapping blocks of dequantized data and provides one block of output data. Each column of input provides an equal size column of inverse transformed output data. After the first inverse transformation pass by inverse MLT 300, the data RAM 310 stores the intermediate inverse transformation data until retrieved row by row. The intermediate inverse transformed data is communicated row by row through the multiplexer 306 back again into the one-dimensional inverse MLT 300 through multiplexer 306 during the second pass to provide a decompressed image communicated through demultiplexer 308 and stored in output buffer 304. Each row of the intermediate inverse transformed data is transformed into a respective row of inverse transformed output data stored in buffer 304. The line-by-line two-dimensional inverse transformation method requires the use of data RAM 310 which must be large enough to store an entire image.

Figure 13:
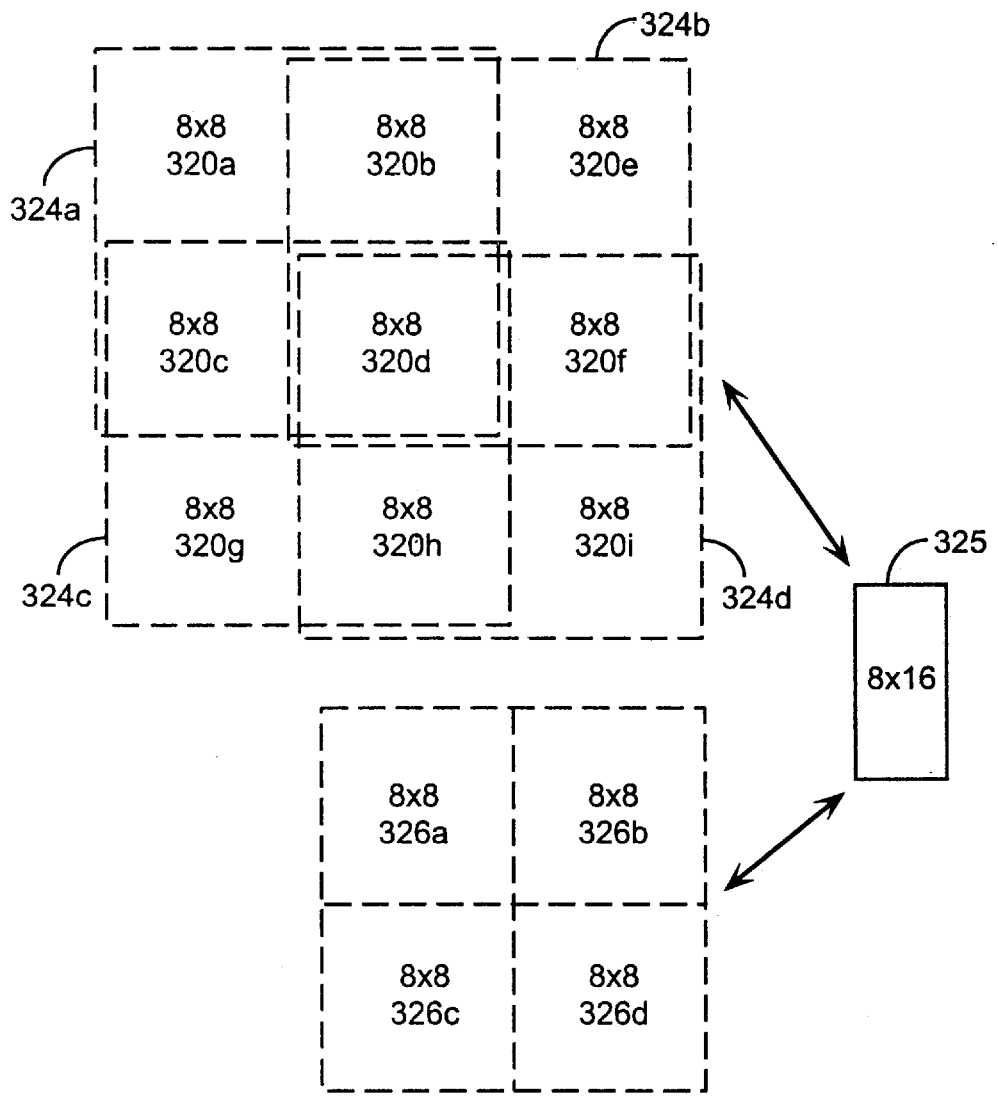
FIG. 13 is a diagram showing the two dimensional transformation process of overlapping blocks of input data.

Many two-dimensional transformation methods can be implemented using various scanning schemes and image segmentation. For example, a preferred block by block two-dimensional transformation method uses the same two-dimensional MLT architecture of FIG. 12 but processes input data block by block, as shown in FIG. 13. In the block by block two dimensional transformation method, the input image is segmented in blocks 320 and windows 324. Each input block 320, of 8 row pixels and 8 column pixels, overlaps with neighboring blocks also of 8 row pixels and 8 column pixels in the two-dimensional image. Four overlapping blocks, example blocks 320abcd form a window 324a of four blocks. Each 16×16 window 324 spans four blocks of input data pixels.

During the first forward transformation pass, each 16×16 window of four blocks is transformed, row by row, into an 8 rows by 16 columns intermediate transformed block of transformed data, but transforming each row independently. During the second pass, the each column of the 8 rows ×16 columns intermediate transformed block is transformed by column into an 8×8 block of transformed data for storage in the output buffer 304. For example, window 324a comprising blocks 320abcd is first transformed into the 8×16 transform block 325. The next window 324b is firstly transformed into an 8×16 transform block 325 which is secondly transformed into the transformed output block 326a. The double pass transformation process continues through the first row of horizontal windows, e.g., 324a and 324b, which transform into transformed output 326a and 326b, respectively, before starting the second row of windows, e.g., 324c and 324d which transform into transformed output 326c and 326d, respectively.

Prior to inverse transformation, the transformed outputs 326 are quantized, encoded, decoded and dequantized into respective dequantized inputs, one window of which also now designated 326abcd for convenience. Dequantized input data 326 define an input window for inverse transformation. The input data 326 is firstly inverse transformed by column to provide the 16 rows ×8 columns of intermediate inverse transformed data 325 stored in the RAM 310 which data is secondly inverse transformed into 8×8 block of decompressed data which is a reconstructed version of the input data block 320a. In this block-by-block two dimensional transformation method, the RAM 310 can be small, and yet an entire input image can be quickly processed, block by block, using two-dimensional blocks. In this manner, the RAM 310 need only be 8×16 words wide.

An evaluation the compression effects of the improved MLT on multiband images can be based upon a comparison of the compression effects of the JPEG/DCT systems. For example, a classification comparison may be on a plurality of band subset of an input image. The image bands are to be independently compressed and decompressed. Classifications are used to compare the decompressed reconstructed image to the original input uncompressed image. The MLT compressed image has higher accuracy of pixels classified the same as the original scene than the JPEG/DCT system. At low bit rates, the image quality obtained from the improved MLT is not only superior to DCT, but is also better than ordinary subband filters, because the MLT can retain more high frequency details similar to wavelet transforms while using overlapped windows to alleviate the boundary effect, even at a compression ratio of ten to one with five band subset.

The improved MLT method and architecture comprises an IIR filter implementing a recursive algorithm. The preferred MLT architecture comprises a window multiplier and a bank of identical parallel forward processors. Each MLT processor comprises a second order IIR digital filter operating in combination with arithmetic function which may be migrated throughout the MLT architecture for implementing the MLT demodulation function. The inverse MLT architecture has a similar architecture to the forward MLT architecture, except that the window multiplier function effectively follows IIR filter. A 2-D MLT transformation method can use the one dimensional MLT architecture. The pipelined forward MLT architecture processes the input image first by row and then by column, whereas the inverse MLT architecture processes the dequantized image first by column and then by row. Preferably the two-dimensional transformation method is a block by block transformation method rather than line by line transformation method. This pipeline MLT architecture can be implemented using field programmable gate arrays. The MLT is amenable to fast pipeline processing in VLSI implementation because it uses fewer and localized interconnects and has a modular structure.

Both the forward and inverse transform method comprises a filtering step and a multiplication step, and in both methods the filtering step comprises recursive filtering steps and arithmetic steps. In the forward transform method, the multiplication step generates a window of n window product data from the input data and forward window values. The n window product data or the window product sum is filtered in the filtering step by n recursive filtering steps providing filtered data, e.g. $r(n)$ and $r(n-1)$, which are arithmetically combined into the block of k forward transformed data. The forward transformed data is quantized, encoded into the compressed data which is decoded and deqauntized into dequantized data. The different between the forward transformed data and the dequantized data results in the loss of spectral quality of the decompressed data as compared to the input data.

In the exemplar case of the forward MLT architecture and processors of FIGS. 4 and 5, the window product data is $W(n)X(n)$, the recursive filter function is $r(n)=r(n)= C(k)r(n-1)-r(n-2)+W(n)X(n)$, the arithmetic function is $A(k)r(N)-B(k)r(N-1)$ to provide the $Z(k)$ block of k forward transform data, and the transforms uses $W(n)$ forward window values, and $A(k)$, $B(k)$ and $C(k)$ transform values.

In the exemplar inverse transform method, the dequantized data is filtered in the filtering step by n recursive filtering steps providing filtered data, e.g. $r(K)$ and $r(K-1)$, and the filtered data is arithmetically combined into n inverse transform data. The multiplication step generates the block of decompressed data from the n inverse transform data and n inverse window values.

In the exemplar case of inverse MLT architecture and processors of FIGS. 10 and 11, a window of blocks of n dequantized data is filtered in the filtering using the recursive filter function is $r(n)=D(k)r(k-1)-r(k-2)+I(k)$ to provide $r(K)$ and $r(K-1)$ filtered data, the arithmetic function adds the $r(K)$ $r(K-1)$ filtered data to provide a window of blocks of n inverse transform data. The multiplication step multiplies n inverse window values $W(i)$ with n inverse transforms data into blocks of intermediate data that is combined into the block the decompressed data.

The implementation enables a fast modular pipeline architecture well suited for VLSI implementation. The MLT technique is well suited for compression and decompressing of two dimensional images and may be well suited to weather satellites and remote sensing involving high spatial resolutions and/or large quantities of multispectral/hyperspectral imagery. Those skilled in the art can make enhancements, improvements and modifications to enhance the invention. However, those enhancements, improvements and modifications may nonetheless fall within the spirit and scope of the following claims.

What is claimed:

1. A forward transform method for forward transforming a plurality of windows of input data respectively into a plurality of blocks of forward transformed data by a forward transform defined by a window function and a modulation function, each window is segmented into a plurality of blocks of input data, each block of input data and each block of forward transformed data have a predetermined block size k, each window has a predetermined window size n and n/k is a positive integer greater than one, each window has an overlapping block of input data in common with another adjacent window of the plurality of windows, wherein the improvement comprises, multiplying forward window values by each window of input data for providing window product data for each window, filtering the window product data for providing a block of forward transformed data, and repeating the multiplying and filtering steps for each successive window of the plurality of windows of input data for providing the respective plurality of blocks of forward transformed data.

2. The method of claim 1 wherein, the number of forward window values is n, the n forward window values are respectively multiplied by the window of n input data for providing n window product data, and the filtering step comprises k parallel filtering steps and respective k arithmetic steps, each k parallel filtering step comprises n recursive steps, the k parallel filtering steps are for recursively filtering the n window product data into k filtered data, the k arithmetic steps are for arithmetically respectively generating k forward transformed data from transform values and from the k filtered data, the k forward transformed data is the block of forward transformed data.

3. The method of claim 1 wherein, the number of forward window values is n respectively multiplied by the window of n input data for providing n window product data, the filtering step comprises k parallel filtering steps and respective k arithmetic steps, each k parallel filtering step comprises n recursive steps, the k parallel filtering steps are for recursively filtering the n window product data into k filtered data, the k arithmetic steps are for arithmetically respectively generating k forward transformed data from transform values and from the k filtered data, the k forward transformed data is the block of forward transformed data, the block of forward transformed data is defined by $Z(k)=A(k)r(N)-B(k)r(N-1)$ where $r(n)=C(k)r(n-1)-r(n-2)+W(n)X(n)$, $W(n)X(n)$ is a window product function, each of the n recursive steps is defined by $r(n)$ a recursive function which generates k filtered data $r(N)$ and $r(N-1)$, $C(k)$ are transform values, and the k arithmetic steps are $A(k)r(N)-B(k)r(N-1)$ arithmetic steps using $A(k)$ and $B(k)$ transform values on the k filter data $r(N)$ and $r(N-1)$.

4. The method of claim 3 wherein, the window function is a half sine window function, the modulation function is a discrete cosine modulation function, the window function and modulation function are defined by weighted coefficients for each window of n input data and for the k parallel filtering steps, the weighted coefficients are:

| | k: | | | | | | | |
|---|---|---|---|---|---|---|---|---|
| n | 1 | 2 | 3 | 4 | 5 | 6 | 7 | 8 |
| 1 | −0.03 | +0.04 | +0.01 | −0.05 | +0.00 | +0.05 | −0.02 | −0.04 |
| 2 | −0.07 | +0.14 | −0.09 | −0.04 | +0.14 | −0.11 | −0.01 | +0.13 |
| 3 | −0.07 | +0.18 | −0.23 | +0.21 | −0.11 | −0.02 | +0.15 | −0.23 |
| 4 | −0.03 | +0.09 | −0.15 | +0.20 | −0.25 | +0.28 | −0.30 | +0.32 |
| 5 | +0.04 | −0.11 | +0.18 | −0.25 | +0.30 | −0.34 | +0.37 | −0.38 |
| 6 | +0.13 | −0.34 | +0.44 | −0.39 | +0.21 | +0.04 | −0.28 | +0.42 |
| 7 | +0.23 | −0.48 | +0.30 | +0.14 | −0.46 | +0.37 | +0.05 | −0.42 |
| 8 | +0.32 | −0.44 | −0.14 | +0.50 | −0.05 | −0.48 | +0.23 | +0.38 |
| 9 | +0.38 | −0.23 | −0.48 | +0.05 | +0.50 | +0.14 | −0.44 | −0.32 |
| 10 | +0.42 | +0.05 | −0.37 | −0.46 | −0.14 | +0.30 | +0.48 | +0.23 |
| 11 | +0.42 | +0.28 | +0.04 | −0.21 | −0.39 | −0.44 | −0.34 | −0.13 |
| 12 | +0.38 | +0.37 | +0.34 | +0.30 | +0.25 | +0.18 | +0.11 | +0.04 |
| 13 | +0.32 | +0.30 | +0.28 | +0.25 | +0.20 | +0.15 | +0.09 | +0.03 |
| 14 | +0.23 | +0.15 | +0.02 | −0.11 | −0.21 | −0.23 | −0.18 | −0.07 |
| 15 | +0.13 | +0.01 | −0.11 | −0.14 | −0.04 | +0.09 | +0.14 | +0.07 |
| 16 | +0.04 | −0.02 | −0.05 | +0.00 | +0.05 | +0.01 | −0.04 | −0.03 |

5. The method of claim 4 wherein,
the $A(k)$, $B(k)$ and $C(k)$ transform values are:

| k | A (k) | B (k) | C (k) |
|---|---|---|---|
| 1 | 0.773010453 | 0.634393284 | 1.961570561 |
| 2 | −0.471396737 | −0.881921264 | 1.662939225 |
| 3 | −0.956940336 | −0.290284677 | 1.111140466 |
| 4 | 0.098017140 | 0.995184727 | 0.390180644 |
| 5 | 0.995184727 | −0.098017140 | −0.390180644 |
| 6 | 0.290284677 | −0.956940336 | −1.111140466 |
| 7 | −0.881921264 | 0.471396737 | −1.662939225 |
| 8 | −0.634393284 | 0.773010453 | −1.961570561, and | the n window values for n=16, are W(1)=0.09802, W(2)=0.29028, W(3)=0.47140, W(4)=0.63439, W(5)=0.77301, W(6)=0.88192, W(7)=0.95694, W(8)=0.99518, W(9)=0.99518, W(10)=0.95694, W(11)=0.88192, W(12)=0.77301, W(13)=0.63439, W(14)=0.47140, W(15)=0.29028, W(16)=0.09802.

6. The method of claim 1 wherein, the number of forward window values is n, the n forward window values are respectively multiplied by the window of n input data for providing n window product data and for providing k window sum data, and the filtering step comprises k parallel filtering steps and respective k arithmetic steps, each k parallel filtering step comprises k recursive filtering, the k parallel filtering steps are for recursively filtering the k window sum data into k filtered data, the k arithmetic steps are for arithmetically respectively generating k forward transformed data from the k filtered data, the k forward transformed data is the block of forward transformed data.

7. The method of claim 1 wherein the number of forward window values is n, the n forward window values are respectively multiplied by the window of n input data for providing n window product data, the filtering step comprises the steps of, input adding for adding each window of n window product data with an adjacent n window product data for providing k window sum data, k parallel filtering for recursively filtering the k window sum data into $r(K)$ and $r(K-1)$ k filtered data, the k parallel filtering is defined by $r(k)$ a recursive function which generates $r(K)$ and $r(K-1)$ k filtered data, k parallel adding of $r(K)$ and $r(K-1)$ k filtered data into k output transformed data, the k output transformed data is defined by $V(k)=r(K)+r(K-1)$ where $r(k)=C(k)r(k-1)-r(k-2)+Y(k)$, wherein $Y(k)$ is the k window sum data, $C(k)$ are transform values, and output multiplying transform values by the k output transformed data for generating k forward transformed data as the block of forward transformed data.

8. The method of claim 7 wherein k is eight, n is sixteen, and the output multiplying transform values are AB1=0.098, AB(2)=0.290, AB3=0.471, AB4=0.634, AB5=0.773, AB6=0.882, AB7=0.957, and AB8=0.995.

9. An inverse transform method for inverse transforming a plurality of windows of dequantized data respectively into a plurality of blocks of decompressed data by an inverse transform defined by a window function and a modulation function of a forward transform, each window is segmented into a plurality of blocks of dequantized data, each block of dequantized data and each block of decompressed data have a predetermined block size k, each window has a predetermined window size and n/k is a positive integer greater than one, each window has an overlapping block of dequantized data in common with another adjacent window of the plurality of windows, wherein the improvement comprises, filtering a window of dequantized data for providing a window of inverse transformed data, multiplying inverse window values to the window of inverse transformed data for providing the respective block of decompressed data, and repeating the filtering and multiplying steps for each successive window of the plurality of windows of dequantized data for providing the respective plurality of blocks of decompressed data.

10. The method of claim 9 wherein the filtering step comprises k parallel filtering steps and respective k arithmetic steps, each k parallel filtering step comprises k recursive steps, the k parallel filtering steps are for recursively filtering the window of n dequantized data respectively into k filtered data, the k arithmetic steps are for arithmetically respectively generating the k inverse transformed data from transform values and from the k filtered data, and the number of inverse window values is n, the n inverse window values are respectively multiplied by the window of n inverse transform data for providing the block of decompressed data.

11. The method of claim 10 wherein each block of dequantized data is filtered in the filtering step by k recursive steps for providing a block of k filtered data, the k arithmetic steps provides n/k blocks of k inverse transformed data from the n/k blocks of k filtered data, the n/k blocks of k inverse transformed data are multiplied in the multiplying step by n inverse window values to provide n/k blocks of intermediate data, and the multiplication step combines the n/k blocks of intermediate data into the block of decompressed data.

12. The method claim 11 wherein, the k recursive steps generate r(K) and r(K−1) filtered data from a block of dequantized data I(k) using a recursive function r(n)=D(k)r(k−1)−r(k−1)+I(k) where D(k) are transform values, the k arithmetic steps add r(K) filter data and (K−1) filter data for providing the n/k blocks of k filtered data, and the multiplication step comprises multiplying the n/k blocks of k filtered data by n inverse window values to provide the n/k blocks of intermediate data which are added together in the multiplication step to provide the block of decompressed data.

13. The method of claim 12 wherein the k D(k) transform values are D(1)=−1.961570561, D(2)=−1.662939225, D(3)=−1.111140466, D(4)=−0.390180644, D(5)=0.390180644, D(6)=1.111140466, D(7)=1.662939225, and D(8)=1.961570561, and the n inverse window values are W(1)=−0.15157, W(2)=+0.51205, W(3)=−0.90223, W(4)=+1.26270, W(5)=−1.53860, W(6)=+1.68791, W(7)=−1.68791, W(8)=+1.53860, W(9)=−1.26270, W(10)=+0.90223, W(11)=−0.51205, W(12)=+0.15157, W(13)=+0.12433, W(14)=−0.27364, W(15)=+0.27364, W(16)=−0.12433.

14. The method of claim 9 wherein, the filtering step comprises k parallel filtering steps and respective k arithmetic steps, each k parallel filtering step comprises k recursive steps, the k parallel filtering steps are for recursively filtering the blocks of the window of dequantized data respectively into k filtered data, the k arithmetic steps are for generating respective k subblocks of the window of inverse transformed data generated from transform values and from the k filtered data, and the n inverse window values have n/k portions for respectively multiplying k inverse window values by the respective k subblocks of the window of inverse transformed data for providing the block of decompressed data.

15. The method of claim 14 wherein, the k recursive steps generate r(K) and r(K−1) filtered data one of the blocks I(k) of the window of dequantized data using a recursive function r(n)=D(k)r(k−1)−r(k−1)+I(k), where D(k) are transform values, the k arithmetic steps add r(K) filter data and r(K−1) filter data, multiply the r(K)+r(K−1) sum by A(k) and B(k) transformed values for providing k respective A(K) products and B(K) products, the k arithmetic steps combine the A and B products to generate the subblocks of the window of inverse transformed data as a block of inverse transformed data, and the multiplication step comprises multiplying the block of inverse transformed data by respective inverse window values to provide the block of decompressed data.

16. The method of claim 15 wherein, k is eight and n is sixteen, and the k arithmetic steps combine the A(K) and B(K) products by a bank adding providing n/k subblocks of U(K) inverse transformed data, the bank adding providing U1=A1+A8, U2=A2+A7, U3=A3+A6, U4=A4+A5, U5=B4+B5, U6=B3+B6, U7=B2+B7 and U8=B1+B8 block of inverse transformed data as the window of inverse transformed data.

17. A compression decompression method for compressing an input image into a compressed image, and for decompressing the compressed image into a decompressed image, the method comprises the steps of, receiving the input image for forward transforming a plurality of windows of input data of the input image respectively into a plurality of blocks of forward transformed data by a forward transform defined by a window function and a modulation function, each window is segmented into a plurality of blocks of input data, each block of input data and each block of forward transformed data have a predetermined block size k, each window has a predetermined window size n and n/k is a positive integer greater than one, each window has an overlapping block of input data in common with another adjacent window of the plurality of windows, multiplying forward window values by each window of input data for providing window product data for each window, filtering the window product data for providing a block of forward transformed data, repeating the multiplying and filtering steps for each successive window of the plurality of windows of input data for providing the respective plurality of blocks of forward transformed data, quantizing the blocks of forward transform data into quantized data, encoding the quantized data into the compressed data, decoding the compressed data into decoded data, dequantizing the decoded data into windows of dequantized data, receiving the windows of dequantized data for inverse transforming the plurality of windows of dequantized data respectively into a plurality of blocks of decompressed data by an inverse transform defined by the window function and the modulation function of the forward transform, each window is segmented into a plurality of blocks of dequantized data, each block of dequantized data and each block of decompressed data have a predetermined block size k, each window has a predetermined window size n and n/k is a positive integer greater than one, each window has an overlapping block of dequantized data in common with another adjacent window of the plurality of windows, filtering a window of dequantized data for providing a window of inverse transformed data, multiplying inverse window values to the window of inverse transformed data for providing a respective block of decompressed data, and repeating the filtering and multiplying steps for each successive window of the plurality of windows of dequantized data for providing the respective plurality of blocks of decompressed data of the decompressed image.

18. The method of claim 17 wherein the input image is a two dimensional image of input data and the dequantized data is a two dimensional image of dequantized data both organized by rows and columns, the forward transform receiving step scans the two dimension image of input data by row, the inverse transform receiving step scans the dequantized data by column, the method further comprises the steps of storing the blocks of forward transformed data by row as intermediate forward transformed data after the forward repeating steps forward transforming the two dimensional image of input data into the intermediate forward transformed data, scanning the intermediate forward transformed data by column, repeating the forward filtering, forward multiplication, and forward repeating steps to forward transform the intermediate forward transform data into a two dimensional image of the blocks of forward transformed data, storing the blocks of the forward transformed data by column before the inverse receiving, inverse filtering, inverse multiplication and inverse repeating steps for generating intermediate inverse transform data, scanning the intermediate inverse transform data by row, and repeating the inverse receiving, inverse filtering, inverse multiplication and inverse repeating steps to inverse transform the intermediate inverse transform data into a two dimensional image of the blocks of decompressed data.

19. The method of claim 18 wherein the input image and the dequantized image are respectively segmented into two dimensional windows of input data and two dimensional windows of dequantized data, each window has two-dimensional blocks overlapping and organized in rows and columns, each two-dimensional window of input data is forward transformed into a two dimensional block of forward transformed data, each two-dimensional window of dequantized data is inverse transformed into a two dimensional block of decompressed data.

20. The method of claim 17 wherein the forward transform is define by $Z(k)=A(k)r(N)-B(k)r(N-1)$, where $r(n)$ is a recursive function $r(n)=C(k)r(n-1)-r(n-2)+W(n)X(n)$, $W(n)X(n)$ is window product data, $W(n)$ are the forward window values, and $A(k)$, $B(k)$ and $C(k)$ are transform values.

* * * * *